(12) United States Patent
Zhu et al.

(10) Patent No.: US 12,457,670 B2
(45) Date of Patent: *Oct. 28, 2025

(54) SYSTEMS AND METHODS FOR CONTROLLING POWER FACTORS OF LED LIGHTING SYSTEMS

(71) Applicant: ON-BRIGHT ELECTRONICS (SHANGHAI) CO., LTD., Shanghai (CN)

(72) Inventors: Liqiang Zhu, Shanghai (CN); Qian Fang, Shanghai (CN); Zhilin Fan, Shanghai (CN); Ke Li, Shanghai (CN)

(73) Assignee: On-Bright Electronics (Shanghai) Co., Ltd., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/639,870

(22) Filed: Apr. 18, 2024

(65) Prior Publication Data

US 2025/0024570 A1 Jan. 16, 2025

Related U.S. Application Data

(63) Continuation of application No. 18/053,873, filed on Nov. 9, 2022, now Pat. No. 11,997,772, which is a
(Continued)

(30) Foreign Application Priority Data

Apr. 13, 2020 (CN) .......................... 202010284661.7

(51) Int. Cl.
*H05B 45/355* (2020.01)
*H05B 45/14* (2020.01)

(52) U.S. Cl.
CPC ........... *H05B 45/355* (2020.01); *H05B 45/14* (2020.01)

(58) Field of Classification Search
CPC ... H05B 45/14; H05B 45/355; H05B 45/3575
See application file for complete search history.

(56) References Cited

U.S. PATENT DOCUMENTS

| 3,803,452 A | 4/1974 | Goldschmied |
| 3,899,713 A | 8/1975 | Barkan et al. |

(Continued)

FOREIGN PATENT DOCUMENTS

| CN | 1448005 A | 10/2003 |
| CN | 101040570 A | 9/2007 |

(Continued)

OTHER PUBLICATIONS

China Intellectual Property Office, Office Action mailed Apr. 1, 2022, in Application No. 202010284661.7.
(Continued)

*Primary Examiner* — Jason M Crawford
(74) *Attorney, Agent, or Firm* — Faegre Drinker Biddle & Reath LLP

(57) ABSTRACT

System and method for controlling a bleeder current to increase a power factor of an LED lighting system without any TRIAC dimmer. For example, the system for controlling a bleeder current to increase a power factor of an LED lighting system without any TRIAC dimmer includes: a first current controller configured to receive a rectified voltage generated by a rectifier that directly receives an AC input voltage without through any TRIAC dimmer; and a second current controller configured to: control a light emitting diode current flowing through one or more light emitting diodes that receive the rectified voltage not clipped by any TRIAC dimmer; and generate a sensing voltage based at least in part upon the light emitting diode current, the sensing voltage representing the light emitting diode current in magnitude.

30 Claims, 9 Drawing Sheets

Related U.S. Application Data continuation of application No. 17/226,625, filed on Apr. 9, 2021, now Pat. No. 11,540,371.

(56) References Cited

U.S. PATENT DOCUMENTS

| | | |
|---|---|---|
| 4,253,045 A | 2/1981 | Weber |
| 5,144,205 A | 9/1992 | Motto et al. |
| 5,249,298 A | 9/1993 | Bolan et al. |
| 5,504,398 A | 4/1996 | Rothenbuhler |
| 5,949,197 A | 9/1999 | Kastner |
| 6,196,208 B1 | 3/2001 | Masters |
| 6,218,788 B1 | 4/2001 | Chen et al. |
| 6,229,271 B1 | 5/2001 | Liu |
| 6,278,245 B1 | 8/2001 | Li et al. |
| 7,038,399 B2 | 5/2006 | Lys et al. |
| 7,649,327 B2 | 1/2010 | Peng |
| 7,759,881 B1 | 7/2010 | Melanson |
| 7,825,715 B1 | 11/2010 | Greenberg |
| 7,880,400 B2 | 2/2011 | Zhou et al. |
| 7,944,153 B2 | 5/2011 | Greenfeld |
| 8,018,171 B1 | 9/2011 | Melanson et al. |
| 8,076,920 B1 | 12/2011 | Melanson |
| 8,098,021 B2 | 1/2012 | Wang et al. |
| 8,129,976 B2 | 3/2012 | Blakeley |
| 8,134,302 B2 | 3/2012 | Yang et al. |
| 8,278,832 B2 | 10/2012 | Hung et al. |
| 8,373,313 B2 | 2/2013 | Garcia et al. |
| 8,378,583 B2 | 2/2013 | Hying et al. |
| 8,378,588 B2 | 2/2013 | Kuo et al. |
| 8,378,589 B2 | 2/2013 | Kuo et al. |
| 8,415,901 B2 | 4/2013 | Recker et al. |
| 8,427,070 B2 * | 4/2013 | Matsuda ............ H05B 45/375 315/308 |
| 8,432,438 B2 | 4/2013 | Ryan et al. |
| 8,497,637 B2 | 7/2013 | Liu |
| 8,558,477 B2 | 10/2013 | Bordin et al. |
| 8,569,956 B2 | 10/2013 | Shteynberg et al. |
| 8,644,041 B2 | 2/2014 | Pansier |
| 8,653,750 B2 | 2/2014 | Deurenberg et al. |
| 8,686,668 B2 | 4/2014 | Grotkowski et al. |
| 8,698,419 B2 | 4/2014 | Yan et al. |
| 8,716,882 B2 | 5/2014 | Pettler et al. |
| 8,742,674 B2 | 6/2014 | Shteynberg et al. |
| 8,829,819 B1 | 9/2014 | Angeles et al. |
| 8,890,440 B2 | 11/2014 | Yan et al. |
| 8,896,288 B2 | 11/2014 | Choi et al. |
| 8,941,324 B2 | 1/2015 | Zhou et al. |
| 8,941,328 B2 * | 1/2015 | Wu .................... H05B 45/3725 315/297 |
| 8,947,010 B2 | 2/2015 | Barrow et al. |
| 9,030,122 B2 | 5/2015 | Yan et al. |
| 9,084,316 B2 | 7/2015 | Melanson et al. |
| 9,131,581 B1 | 9/2015 | Hsia et al. |
| 9,148,050 B2 | 9/2015 | Chiang |
| 9,167,638 B2 | 10/2015 | Le |
| 9,173,258 B2 | 10/2015 | Ekbote |
| 9,207,265 B1 | 12/2015 | Grisamore et al. |
| 9,220,133 B2 | 12/2015 | Salvestrini et al. |
| 9,220,136 B2 | 12/2015 | Zhang et al. |
| 9,247,623 B2 | 1/2016 | Recker et al. |
| 9,247,625 B2 | 1/2016 | Recker et al. |
| 9,301,349 B2 | 3/2016 | Zhu et al. |
| 9,332,609 B1 | 5/2016 | Rhodes et al. |
| 9,402,293 B2 | 7/2016 | Vaughan et al. |
| 9,408,269 B2 | 8/2016 | Zhu et al. |
| 9,414,455 B2 | 8/2016 | Zhou et al. |
| 9,467,137 B2 | 10/2016 | Eum et al. |
| 9,480,118 B2 | 10/2016 | Liao et al. |
| 9,485,833 B2 | 11/2016 | Datta et al. |
| 9,532,416 B2 | 12/2016 | Van et al. |
| 9,554,432 B2 | 1/2017 | Zhu et al. |
| 9,572,224 B2 | 2/2017 | Gaknoki et al. |
| 9,585,222 B2 | 2/2017 | Zhu et al. |
| 9,655,188 B1 | 5/2017 | Lewis et al. |
| 9,661,702 B2 | 5/2017 | Mednik et al. |
| 9,723,676 B2 | 8/2017 | Ganick et al. |
| 9,750,107 B2 | 8/2017 | Zhu et al. |
| 9,781,786 B2 | 10/2017 | Ho et al. |
| 9,820,344 B1 | 11/2017 | Papanicolaou |
| 9,883,561 B1 | 1/2018 | Liang et al. |
| 9,883,562 B2 | 1/2018 | Zhu et al. |
| 9,961,734 B2 | 5/2018 | Zhu et al. |
| 10,054,271 B2 | 8/2018 | Xiong et al. |
| 10,153,684 B2 | 12/2018 | Liu et al. |
| 10,194,500 B2 | 1/2019 | Zhu et al. |
| 10,264,642 B2 | 4/2019 | Liang et al. |
| 10,292,217 B2 | 5/2019 | Zhu et al. |
| 10,299,328 B2 | 5/2019 | Fu et al. |
| 10,334,677 B2 | 6/2019 | Zhu et al. |
| 10,342,087 B2 | 7/2019 | Zhu et al. |
| 10,362,643 B2 | 7/2019 | Kim et al. |
| 10,375,785 B2 | 8/2019 | Li et al. |
| 10,383,187 B2 | 8/2019 | Liao et al. |
| 10,405,392 B1 | 9/2019 | Shi et al. |
| 10,447,171 B2 | 10/2019 | Newman, Jr. et al. |
| 10,448,469 B2 | 10/2019 | Zhu et al. |
| 10,448,470 B2 | 10/2019 | Zhu et al. |
| 10,455,657 B2 | 10/2019 | Zhu et al. |
| 10,499,467 B2 | 12/2019 | Wang |
| 10,512,131 B2 | 12/2019 | Zhu et al. |
| 10,530,268 B2 | 1/2020 | Newman et al. |
| 10,568,185 B1 | 2/2020 | Ostrovsky et al. |
| 10,616,975 B2 | 4/2020 | Gotou et al. |
| 10,687,397 B2 | 6/2020 | Zhu et al. |
| 10,785,837 B2 | 9/2020 | Li et al. |
| 10,827,588 B2 | 11/2020 | Zhu et al. |
| 10,973,095 B2 | 4/2021 | Zhu et al. |
| 10,999,903 B2 | 5/2021 | Li et al. |
| 10,999,904 B2 | 5/2021 | Zhu et al. |
| 11,026,304 B2 | 6/2021 | Li et al. |
| 11,183,996 B2 * | 11/2021 | Zhu ....................... H05B 45/10 |
| 11,201,612 B2 | 12/2021 | Zhu et al. |
| 11,206,015 B2 | 12/2021 | Zhu et al. |
| 11,212,885 B2 | 12/2021 | Liao et al. |
| 11,224,105 B2 | 1/2022 | Yang et al. |
| 11,252,799 B2 | 2/2022 | Li et al. |
| 11,540,371 B2 * | 12/2022 | Zhu ....................... H05B 45/14 |
| 11,997,772 B2 * | 5/2024 | Zhu ....................... H05B 45/14 |
| 2006/0022648 A1 | 2/2006 | Ben-Yaakov et al. |
| 2007/0182338 A1 | 8/2007 | Shteynberg et al. |
| 2007/0182699 A1 | 8/2007 | Ha et al. |
| 2007/0267978 A1 | 11/2007 | Shteynberg et al. |
| 2008/0224629 A1 | 9/2008 | Melanson |
| 2008/0224633 A1 | 9/2008 | Melanson et al. |
| 2008/0278092 A1 | 11/2008 | Lys et al. |
| 2009/0021469 A1 | 1/2009 | Yeo et al. |
| 2009/0085494 A1 | 4/2009 | Summerland |
| 2009/0251059 A1 | 10/2009 | Veltman |
| 2010/0141153 A1 | 6/2010 | Recker et al. |
| 2010/0148691 A1 | 6/2010 | Kuo et al. |
| 2010/0156319 A1 | 6/2010 | Melanson |
| 2010/0164406 A1 | 7/2010 | Kost et al. |
| 2010/0176733 A1 | 7/2010 | King |
| 2010/0207536 A1 | 8/2010 | Burdalski et al. |
| 2010/0213859 A1 | 8/2010 | Shteynberg et al. |
| 2010/0219766 A1 | 9/2010 | Kuo et al. |
| 2010/0231136 A1 | 9/2010 | Reisenauer et al. |
| 2011/0012530 A1 | 1/2011 | Zheng et al. |
| 2011/0037399 A1 | 2/2011 | Hung et al. |
| 2011/0074302 A1 | 3/2011 | Draper et al. |
| 2011/0080110 A1 | 4/2011 | Nuhfer et al. |
| 2011/0080111 A1 | 4/2011 | Nuhfer et al. |
| 2011/0101867 A1 | 5/2011 | Wang et al. |
| 2011/0121744 A1 | 5/2011 | Salvestrini et al. |
| 2011/0121754 A1 | 5/2011 | Shteynberg et al. |
| 2011/0133662 A1 | 6/2011 | Yan et al. |
| 2011/0140620 A1 | 6/2011 | Lin et al. |
| 2011/0140621 A1 | 6/2011 | Yi et al. |
| 2011/0187283 A1 | 8/2011 | Wang et al. |
| 2011/0227490 A1 | 9/2011 | Huynh |
| 2011/0260619 A1 | 10/2011 | Sadwick et al. |
| 2011/0285301 A1 | 11/2011 | Kuang et al. |
| 2011/0291583 A1 | 12/2011 | Shen |
| 2011/0309759 A1 | 12/2011 | Shteynberg et al. |

(56) References Cited

U.S. PATENT DOCUMENTS

| | | |
|---|---|---|
| 2012/0001548 A1 | 1/2012 | Recker et al. |
| 2012/0032604 A1 | 2/2012 | Hontele |
| 2012/0056553 A1 | 3/2012 | Koolen et al. |
| 2012/0069616 A1 | 3/2012 | Kitamura et al. |
| 2012/0080944 A1 | 4/2012 | Recker et al. |
| 2012/0081009 A1 | 4/2012 | Shteynberg et al. |
| 2012/0081032 A1 | 4/2012 | Huang |
| 2012/0146526 A1 | 6/2012 | Lam et al. |
| 2012/0181944 A1 | 7/2012 | Jacobs et al. |
| 2012/0181946 A1 | 7/2012 | Melanson |
| 2012/0187857 A1 | 7/2012 | Ulmann et al. |
| 2012/0242237 A1 | 9/2012 | Chen et al. |
| 2012/0262093 A1 | 10/2012 | Recker et al. |
| 2012/0268031 A1 | 10/2012 | Zhou et al. |
| 2012/0274227 A1 | 11/2012 | Zheng et al. |
| 2012/0286679 A1 | 11/2012 | Liu |
| 2012/0299500 A1 | 11/2012 | Sadwick et al. |
| 2012/0299501 A1 | 11/2012 | Kost et al. |
| 2012/0299511 A1 | 11/2012 | Montante et al. |
| 2012/0319604 A1 | 12/2012 | Walters |
| 2012/0326616 A1 | 12/2012 | Sumitani et al. |
| 2013/0009561 A1 | 1/2013 | Briggs |
| 2013/0020965 A1 | 1/2013 | Kang et al. |
| 2013/0026942 A1 | 1/2013 | Ryan et al. |
| 2013/0026945 A1 | 1/2013 | Ganick et al. |
| 2013/0027528 A1 | 1/2013 | Staats et al. |
| 2013/0034172 A1 | 2/2013 | Pettler et al. |
| 2013/0043726 A1 | 2/2013 | Krishnamoorthy et al. |
| 2013/0049631 A1 | 2/2013 | Riesebosch |
| 2013/0063047 A1 | 3/2013 | Veskovic |
| 2013/0141001 A1 | 6/2013 | Datta et al. |
| 2013/0154487 A1 | 6/2013 | Kuang et al. |
| 2013/0162155 A1 | 6/2013 | Matsuda et al. |
| 2013/0162158 A1 | 6/2013 | Pollischansky |
| 2013/0175931 A1 | 7/2013 | Sadwick |
| 2013/0181630 A1 | 7/2013 | Taipale et al. |
| 2013/0193866 A1 | 8/2013 | Datta et al. |
| 2013/0193879 A1 | 8/2013 | Sadwick et al. |
| 2013/0194848 A1 | 8/2013 | Bernardinis et al. |
| 2013/0215655 A1 | 8/2013 | Yang et al. |
| 2013/0223107 A1 | 8/2013 | Zhang et al. |
| 2013/0229121 A1 | 9/2013 | Otake et al. |
| 2013/0241427 A1 | 9/2013 | Kesterson et al. |
| 2013/0241428 A1 | 9/2013 | Takeda |
| 2013/0241441 A1 | 9/2013 | Myers et al. |
| 2013/0242622 A1 | 9/2013 | Peng et al. |
| 2013/0249431 A1 | 9/2013 | Shteynberg et al. |
| 2013/0278159 A1 | 10/2013 | Del et al. |
| 2013/0307430 A1 | 11/2013 | Blom |
| 2013/0307431 A1 | 11/2013 | Zhu et al. |
| 2013/0307434 A1 | 11/2013 | Zhang et al. |
| 2013/0342127 A1 | 12/2013 | Pan et al. |
| 2014/0009082 A1 | 1/2014 | King et al. |
| 2014/0029315 A1 | 1/2014 | Zhang et al. |
| 2014/0049177 A1 | 2/2014 | Kulczycki et al. |
| 2014/0063857 A1 | 3/2014 | Peng et al. |
| 2014/0078790 A1 | 3/2014 | Lin et al. |
| 2014/0103829 A1 | 4/2014 | Kang |
| 2014/0132172 A1 | 5/2014 | Zhu et al. |
| 2014/0160809 A1 | 6/2014 | Lin et al. |
| 2014/0176016 A1 | 6/2014 | Li et al. |
| 2014/0177280 A1 | 6/2014 | Yang et al. |
| 2014/0197760 A1 | 7/2014 | Radermacher |
| 2014/0265898 A1 | 9/2014 | Del et al. |
| 2014/0265907 A1 | 9/2014 | Su et al. |
| 2014/0265935 A1 | 9/2014 | Sadwick et al. |
| 2014/0268935 A1 | 9/2014 | Chiang |
| 2014/0300274 A1 | 10/2014 | Acatrinei |
| 2014/0320031 A1* | 10/2014 | Wu ................. H05B 45/397 315/193 |
| 2014/0333228 A1 | 11/2014 | Angeles et al. |
| 2014/0346973 A1 | 11/2014 | Zhu et al. |
| 2014/0354157 A1 | 12/2014 | Morales |
| 2014/0354165 A1 | 12/2014 | Malyna et al. |
| 2014/0354170 A1 | 12/2014 | Gredler et al. |
| 2015/0015159 A1 | 1/2015 | Wang et al. |
| 2015/0035450 A1 | 2/2015 | Werner |
| 2015/0048757 A1 | 2/2015 | Boonen et al. |
| 2015/0062981 A1 | 3/2015 | Fang et al. |
| 2015/0077009 A1 | 3/2015 | Kunimatsu |
| 2015/0091470 A1 | 4/2015 | Zhou et al. |
| 2015/0137704 A1 | 5/2015 | Angeles et al. |
| 2015/0181669 A1* | 6/2015 | van den Broeke .... H05B 45/10 315/200 R |
| 2015/0312978 A1 | 10/2015 | Vaughan et al. |
| 2015/0312982 A1 | 10/2015 | Melanson |
| 2015/0312988 A1 | 10/2015 | Liao et al. |
| 2015/0318789 A1 | 11/2015 | Yang et al. |
| 2015/0333764 A1 | 11/2015 | Pastore et al. |
| 2015/0357910 A1 | 12/2015 | Murakami et al. |
| 2015/0359054 A1 | 12/2015 | Lin et al. |
| 2015/0366010 A1 | 12/2015 | Mao et al. |
| 2015/0382424 A1 | 12/2015 | Knapp et al. |
| 2016/0014861 A1 | 1/2016 | Zhu et al. |
| 2016/0014865 A1* | 1/2016 | Zhu ..................... H05B 47/16 315/223 |
| 2016/0037604 A1 | 2/2016 | Zhu et al. |
| 2016/0119998 A1 | 4/2016 | Linnartz et al. |
| 2016/0128142 A1 | 5/2016 | Arulandu et al. |
| 2016/0277411 A1 | 9/2016 | Dani et al. |
| 2016/0286617 A1 | 9/2016 | Takahashi et al. |
| 2016/0323957 A1 | 11/2016 | Hu et al. |
| 2016/0338163 A1 | 11/2016 | Zhu et al. |
| 2017/0006684 A1 | 1/2017 | Tu et al. |
| 2017/0027029 A1 | 1/2017 | Hu et al. |
| 2017/0064787 A1 | 3/2017 | Liao et al. |
| 2017/0099712 A1 | 4/2017 | Hilgers et al. |
| 2017/0181235 A1 | 6/2017 | Zhu et al. |
| 2017/0196062 A1* | 7/2017 | Wang ................. H05B 47/1965 |
| 2017/0196063 A1 | 7/2017 | Zhu et al. |
| 2017/0251532 A1 | 8/2017 | Wang et al. |
| 2017/0311409 A1 | 10/2017 | Zhu et al. |
| 2017/0354008 A1 | 12/2017 | Eum et al. |
| 2017/0359880 A1 | 12/2017 | Zhu et al. |
| 2018/0035507 A1 | 2/2018 | Kumada et al. |
| 2018/0103520 A1 | 4/2018 | Zhu et al. |
| 2018/0110104 A1 | 4/2018 | Liang et al. |
| 2018/0115234 A1 | 4/2018 | Liu et al. |
| 2018/0139816 A1 | 5/2018 | Liu et al. |
| 2018/0220504 A1* | 8/2018 | Seki .................. H04B 10/116 |
| 2018/0288845 A1 | 10/2018 | Zhu et al. |
| 2018/0310376 A1 | 10/2018 | Huang et al. |
| 2019/0069364 A1 | 2/2019 | Zhu et al. |
| 2019/0069366 A1 | 2/2019 | Liao et al. |
| 2019/0082507 A1* | 3/2019 | Zhu .................... H05B 45/31 |
| 2019/0124736 A1* | 4/2019 | Zhu .................... H03K 5/24 |
| 2019/0166667 A1 | 5/2019 | Li et al. |
| 2019/0208591 A1* | 7/2019 | Chen .................. H05B 45/10 |
| 2019/0230755 A1 | 7/2019 | Zhu et al. |
| 2019/0327810 A1 | 10/2019 | Zhu et al. |
| 2019/0350060 A1 | 11/2019 | Li et al. |
| 2019/0380183 A1 | 12/2019 | Li et al. |
| 2020/0100340 A1 | 3/2020 | Zhu et al. |
| 2020/0146121 A1 | 5/2020 | Zhu et al. |
| 2020/0205263 A1 | 6/2020 | Zhu et al. |
| 2020/0205264 A1 | 6/2020 | Zhu et al. |
| 2020/0267817 A1 | 8/2020 | Yang et al. |
| 2020/0305247 A1 | 9/2020 | Li et al. |
| 2020/0375001 A1 | 11/2020 | Jung et al. |
| 2021/0007195 A1 | 1/2021 | Zhu et al. |
| 2021/0007196 A1 | 1/2021 | Zhu et al. |
| 2021/0045213 A1* | 2/2021 | Zhu .................... H05B 45/397 |
| 2021/0153313 A1* | 5/2021 | Li ....................... H05B 47/165 |
| 2021/0195709 A1 | 6/2021 | Li et al. |
| 2021/0204375 A1 | 7/2021 | Li et al. |
| 2021/0321501 A1* | 10/2021 | Zhu .................... H05B 45/355 |
| 2022/0038085 A1 | 2/2022 | Zhu et al. |
| 2023/0180364 A1* | 6/2023 | Zhu .................... H05B 45/14 315/291 |

FOREIGN PATENT DOCUMENTS

| | | |
|---|---|---|
| CN | 101657057 A | 2/2010 |
| CN | 101868090 A | 10/2010 |

(56) References Cited

FOREIGN PATENT DOCUMENTS

| | | |
|---|---|---|
| CN | 101896022 A | 11/2010 |
| CN | 101917804 A | 12/2010 |
| CN | 101938865 A | 1/2011 |
| CN | 101998734 A | 3/2011 |
| CN | 102014540 A | 4/2011 |
| CN | 102014551 A | 4/2011 |
| CN | 102056378 A | 5/2011 |
| CN | 102209412 A | 10/2011 |
| CN | 102300375 A | 12/2011 |
| CN | 102347607 A | 2/2012 |
| CN | 102387634 A | 3/2012 |
| CN | 102474953 A | 5/2012 |
| CN | 102497706 A | 6/2012 |
| CN | 102612194 A | 7/2012 |
| CN | 202353859 U | 7/2012 |
| CN | 102668717 A | 9/2012 |
| CN | 102695330 A | 9/2012 |
| CN | 102791056 A | 11/2012 |
| CN | 102843836 A | 12/2012 |
| CN | 202632722 U | 12/2012 |
| CN | 102870497 A | 1/2013 |
| CN | 102946674 A | 2/2013 |
| CN | 103004290 A | 3/2013 |
| CN | 103024994 A | 4/2013 |
| CN | 103096606 A | 5/2013 |
| CN | 103108470 A | 5/2013 |
| CN | 103260302 A | 8/2013 |
| CN | 103313472 A | 9/2013 |
| CN | 103369802 A | 10/2013 |
| CN | 103379712 A | 10/2013 |
| CN | 103428953 A | 12/2013 |
| CN | 103458579 A | 12/2013 |
| CN | 103547014 A | 1/2014 |
| CN | 103716934 A | 4/2014 |
| CN | 103858524 A | 6/2014 |
| CN | 203675408 U | 6/2014 |
| CN | 103945614 A | 7/2014 |
| CN | 103957634 A | 7/2014 |
| CN | 104066254 A | 9/2014 |
| CN | 104125680 A | 10/2014 |
| CN | 204244540 U | 4/2015 |
| CN | 104619077 A | 5/2015 |
| CN | 104735860 A | 6/2015 |
| CN | 204392621 U | 6/2015 |
| CN | 103648219 B | 7/2015 |
| CN | 104768265 A | 7/2015 |
| CN | 104868703 A | 8/2015 |
| CN | 103781229 B | 9/2015 |
| CN | 105246218 A | 1/2016 |
| CN | 105265019 A | 1/2016 |
| CN | 105423140 A | 3/2016 |
| CN | 105591553 A | 5/2016 |
| CN | 205320340 U | 6/2016 |
| CN | 105873269 A | 8/2016 |
| CN | 105992440 A | 10/2016 |
| CN | 106105395 A | 11/2016 |
| CN | 106163009 A | 11/2016 |
| CN | 205812458 U | 12/2016 |
| CN | 106332374 A | 1/2017 |
| CN | 106332390 A | 1/2017 |
| CN | 106358337 A | 1/2017 |
| CN | 106413189 A | 2/2017 |
| CN | 206042434 U | 3/2017 |
| CN | 106604460 A | 4/2017 |
| CN | 106664764 A | 5/2017 |
| CN | 106793246 A | 5/2017 |
| CN | 106888524 A | 6/2017 |
| CN | 107046751 A | 8/2017 |
| CN | 107069726 A | 8/2017 |
| CN | 106912144 B | 1/2018 |
| CN | 107613603 A | 1/2018 |
| CN | 107635324 A | 1/2018 |
| CN | 107645804 A | 1/2018 |
| CN | 104902653 B | 4/2018 |
| CN | 107995750 A | 5/2018 |
| CN | 207460551 U | 6/2018 |
| CN | 108337764 A | 7/2018 |
| CN | 207603948 U | 7/2018 |
| CN | 108366460 A | 8/2018 |
| CN | 108377600 A | 8/2018 |
| CN | 207744191 U | 8/2018 |
| CN | 207910676 U | 9/2018 |
| CN | 108834259 A | 11/2018 |
| CN | 109246885 A | 1/2019 |
| CN | 208572500 U | 3/2019 |
| CN | 109729621 A | 5/2019 |
| CN | 110086362 A | 8/2019 |
| CN | 110099495 A | 8/2019 |
| CN | 107995747 B | 11/2019 |
| CN | 110493913 A | 11/2019 |
| EP | 2403318 A1 | 1/2012 |
| EP | 2938164 A2 | 10/2015 |
| EP | 2590477 B1 | 4/2018 |
| JP | 2008-010152 A | 1/2008 |
| JP | 2009-070878 A | 4/2009 |
| JP | 2011-249328 A | 12/2011 |
| KR | 10-2013-0072952 A | 7/2013 |
| TW | 201125441 A1 | 7/2011 |
| TW | 201132241 A1 | 9/2011 |
| TW | 201143501 A | 12/2011 |
| TW | 201143530 A1 | 12/2011 |
| TW | 201146087 A1 | 12/2011 |
| TW | 201204168 A1 | 1/2012 |
| TW | 201208463 A1 | 2/2012 |
| TW | 201208481 A1 | 2/2012 |
| TW | 201208486 A1 | 2/2012 |
| TW | 201215228 A1 | 4/2012 |
| TW | 201233021 A1 | 8/2012 |
| TW | 201244543 A1 | 11/2012 |
| TW | I387396 B1 | 2/2013 |
| TW | 201315118 A1 | 4/2013 |
| TW | 201322825 A1 | 6/2013 |
| TW | 201336345 A1 | 9/2013 |
| TW | 201342987 A | 10/2013 |
| TW | 201348909 A | 12/2013 |
| TW | I422130 B | 1/2014 |
| TW | I423732 B | 1/2014 |
| TW | 201412189 A | 3/2014 |
| TW | 201414146 A | 4/2014 |
| TW | I434616 B | 4/2014 |
| TW | M477115 U | 4/2014 |
| TW | 201417626 A | 5/2014 |
| TW | 201417631 A | 5/2014 |
| TW | 201422045 A | 6/2014 |
| TW | 201424454 A | 6/2014 |
| TW | I441428 B | 6/2014 |
| TW | I448198 B | 8/2014 |
| TW | 201503756 A | 1/2015 |
| TW | 201515514 A | 4/2015 |
| TW | I496502 B | 8/2015 |
| TW | 201603644 A | 1/2016 |
| TW | 201607368 A | 2/2016 |
| TW | I524814 B | 3/2016 |
| TW | I535175 B | 5/2016 |
| TW | I540809 B | 7/2016 |
| TW | 201630468 A | 8/2016 |
| TW | 201639415 A | 11/2016 |
| TW | I580307 B | 4/2017 |
| TW | I630842 B | 7/2018 |
| TW | 201909699 A | 3/2019 |
| TW | 201927074 A | 7/2019 |

OTHER PUBLICATIONS

China Intellectual Property Office, Office Action mailed Nov. 21, 2022, in Application No. 202010284661.7.

China Intellectual Property Office, Office Action mailed Sep. 27, 2021, in Application No. 202010284661.7.

Qi et al., "Sine Wave Dimming Circuit Based on PIC16 MCU," Electronic Technology Application in 2014, vol. 10, (2014).

(56) References Cited

OTHER PUBLICATIONS

Taiwan Intellectual Property Office, Office Action mailed Jan. 20, 2021, in Application No. 109119044.

* cited by examiner

SYSTEMS AND METHODS FOR CONTROLLING POWER FACTORS OF LED LIGHTING SYSTEMS

1. CROSS-REFERENCES TO RELATED APPLICATIONS

This application is a continuation of U.S. patent application Ser. No. 18/053,873, filed Nov. 9, 2022, which is a continuation of U.S. patent application Ser. No. 17/226,625, filed Apr. 9, 2021, which claims priority to Chinese Patent Application No. 202010284661.7, filed Apr. 13, 2020, all of the above applications being incorporated by reference herein for all purposes.

2. BACKGROUND OF THE INVENTION

Certain embodiments of the present invention are directed to circuits. More particularly, some embodiments of the invention provide systems and methods for controlling power factors. Merely by way of example, some embodiments of the invention have been applied to light emitting diodes (LEDs). But it would be recognized that the invention has a much broader range of applicability.

With development in the light-emitting diode (LED) lighting market, many countries and/or organizations have imposed certain requirements on power factor (PF) of LED lighting systems. For example, the power factor (PF) is required to be larger than 0.9.

FIG. 1 is a simplified diagram showing a conventional LED lighting system without any Triode for Alternating Current (TRIAC) dimmer. As shown in FIG. 1, the LED lighting system 100 includes a rectifier 120 (e.g., BD1), one or more LEDs 130, and a control unit 110 for LED output current. Also, the LED lighting system 100 does not include any TRIAC dimmer. The control unit 110 for LED output current includes an operational amplifier 112 (e.g., U1), a transistor 114 (e.g., M1), and a resistor 116 (e.g., R1). For example, the rectifier 120 (e.g., BD1) is a full wave rectifier. As an example, the transistor 114 (e.g., M1) is a field-effect transistor.

As shown in FIG. 1, a current 131 (e.g., $I_{led}$) flows through the one or more LEDs 130, and the control unit 110 for LED output current is used to keep the current 131 (e.g., $I_{led}$) equal to a constant magnitude that is larger than zero during a duration of time. The operational amplifier 112 (e.g., U1) includes a non-inverting input terminal (e.g., the "+" input terminal), an inverting input terminal (e.g., the "−" input terminal), and an output terminal. The non-inverting input terminal (e.g., the "+" input terminal) of the operational amplifier 112 (e.g., U1) receives a reference voltage 111 (e.g., $V_{ref}$), and the inverting input terminal (e.g., the "−" input terminal) of the operational amplifier 112 (e.g., U1) receives a sensing voltage 113 (e.g., $V_{sense}$) from the source terminal of the transistor 114 (e.g., M1) and a terminal of the resistor 116 (e.g., R1), which are connected to each other. Another terminal of the resistor 116 (e.g., R1) is biased to a ground voltage. The transistor 114 (e.g., M1) also includes a drain terminal and a gate terminal. The gate terminal of the transistor 114 (e.g., M1) is connected to the output terminal of the operational amplifier 112 (e.g., U1), and the drain terminal of the transistor 114 (e.g., M1) is connected to a cathode of the one or more LEDs 130.

After the LED lighting system 100 is powered on, an AC input voltage 121 (e.g., $V_{AC}$) is received directly by the rectifier 120 (e.g., BD1) without through any TRIAC dimmer. The rectifier 120 (e.g., BD1) rectifies the AC input voltage 121 (e.g., $V_{AC}$) and generates a rectified voltage 123 (e.g., $V_{in}$). The rectified voltage 123 (e.g., $V_{in}$) is used to control the current 131 (e.g., $I_{led}$) that flows through the one or more LEDs 130. As shown in FIG. 1, after the LED lighting system 100 is powered on, the output terminal of the operational amplifier 112 (e.g., U1) generates a drive signal 115 that turns on or turns off the transistor 114 (e.g., M1). When the transistor 114 (e.g., M1) is turned on, if the rectified voltage 123 (e.g., $V_{in}$) becomes larger than a predetermined threshold voltage, the current 131 (e.g., $I_{led}$) that flows through the one or more LEDs 130 becomes larger than zero in magnitude, and the current 131 (e.g., $I_{led}$) flows through not only the one or more LEDs 130 but also the transistor 114 (e.g., M1) and the resistor 116 (e.g., R1) to generate the sensing voltage 113 (e.g., $V_{sense}$). The sensing voltage 113 (e.g., $V_{sense}$) is received by the operational amplifier 112 (e.g., U1), which also uses the reference voltage 111 (e.g., $V_{ref}$) to regulate the drive signal 115 to keep the current 131 (e.g., $I_{led}$) constant until the rectified voltage 123 (e.g., $V_{in}$) becomes smaller than the predetermined threshold voltage. The current 131 (e.g., $I_{led}$) that flows through the one or more LEDs 130 is equal to a current 125 (e.g., $I_{in}$) that is provided by the rectifier 120 (e.g., BD1), which also generates the rectified voltage 123 (e.g., $V_{in}$).

FIG. 2 shows simplified timing diagrams for the conventional LED lighting system 100 without any TRIAC dimmer as shown in FIG. 1. The waveform 223 represents the rectified voltage 123 (e.g., $V_{in}$) as a function of time, and the waveform 225 represents the current 125 (e.g., $I_{in}$) as a function of time.

Each cycle of the AC input voltage 121 (e.g., $V_{AC}$) includes two half cycles of the AC input voltage 121 (e.g., $V_{AC}$). One half cycle of the AC input voltage 121 (e.g., $V_{AC}$) corresponds to one cycle of the rectified voltage 123 (e.g., $V_{in}$). As shown by the waveform 223, one half cycle of the AC input voltage 121 (e.g., $V_{AC}$) starts at time $t_1$, passes time $t_2$ and time $t_3$, and ends at time $t_4$. At time $t_1$ and time $t_4$, the rectified voltage 123 (e.g., $V_{in}$) is equal to zero in magnitude. After time $t_1$ but before time $t_4$, the rectified voltage 123 (e.g., $V_{in}$) is larger than zero in magnitude during the entire duration from time $t_1$ and time $t_4$.

From time $t_1$ to time $t_2$, the rectified voltage 123 (e.g., $V_{in}$) is larger than zero in magnitude after time $t_1$, but the rectified voltage 123 (e.g., $V_{in}$) remains smaller than the predetermined threshold voltage 290 as shown by the waveform 223. Also, from time $t_1$ to time $t_2$, the current 125 (e.g., $I_{in}$) is equal to zero as shown by the waveform 225. Additionally, from time $t_2$ to time $t_3$, the rectified voltage 123 (e.g., $V_{in}$) is larger than the predetermined threshold voltage 290, and the current 125 (e.g., $I_{in}$) is larger than zero. The predetermined threshold voltage 290 represents the minimum magnitude of the rectified voltage 123 (e.g., $V_{in}$) for the voltage across the one or more LEDs 130 to reach the forward threshold voltage of the one or more LEDs 130. As shown by the waveform 225, from time $t_2$ to time $t_3$, the current 125 (e.g., $I_{in}$) is kept equal to the constant magnitude 292 that is larger than zero. Also, from time $t_3$ to time $t_4$, the rectified voltage 123 (e.g., $V_{in}$) is larger than zero in magnitude before time $t_4$, but the rectified voltage 123 (e.g., $V_{in}$) remains smaller than the predetermined threshold voltage 290 as shown by the waveform 223. Also, from time $t_3$ to time $t_4$, the current 125 (e.g., $I_{in}$) is equal to zero as shown by the waveform 225. Additionally, as shown by the waveform 225, at time $t_2$, the current 125 (e.g., $I_{in}$) rises from zero to the constant magnitude 292, and at time $t_3$, the current 125 (e.g., $I_{in}$) drops from the constant magnitude 292 to zero in magnitude.

From time $t_1$ to time $t_2$ and from time $t_3$ to time $t_4$, the current 125 (e.g., $I_{in}$) is equal to zero and the reactive power is generated for the LED lighting system 100. In contrast, from time $t_2$ to time $t_3$, the current 125 (e.g., $I_{in}$) is larger than zero, the rectified voltage 123 (e.g., $V_{in}$) is also larger than zero, and the active power is generated for the LED lighting system 100. For example, the power factor of the LED lighting system 100 is determined as follows:

$$PF = \frac{P_{active}}{P_{active} + P_{reactive}} \quad \text{(Equation 1)}$$

where PF represents the power factor, $P_{active}$ represents the active power, and $P_{reactive}$ represents the reactive power.

As shown in FIG. 2, if the predetermined threshold voltage 290 related to the one or more LEDs 130 increases, the time duration from time $t_2$ to time $t_3$ decreases, but the time duration from time $t_1$ to time $t_2$ and the time duration from time $t_3$ to time $t_4$ both increase, causing the active power to decrease and the reactive power to increase. As an example, with the decreasing active power and the increasing reactive power, the power factor also decreases.

As shown in FIG. 1 and FIG. 2, the conventional LED lighting system often cannot achieve a power factor (PF) that is large enough to satisfy the requirement on the power factor (PF) of the LED lighting system. Hence it is highly desirable to improve the techniques related to LED lighting systems.

3. BRIEF SUMMARY OF THE INVENTION

Certain embodiments of the present invention are directed to circuits. More particularly, some embodiments of the invention provide systems and methods for controlling power factors. Merely by way of example, some embodiments of the invention have been applied to light emitting diodes (LEDs). But it would be recognized that the invention has a much broader range of applicability.

According to some embodiments, a system for controlling a bleeder current to increase a power factor of an LED lighting system without any TRIAC dimmer includes: a first current controller configured to receive a rectified voltage generated by a rectifier that directly receives an AC input voltage without through any TRIAC dimmer; and a second current controller configured to: control a light emitting diode current flowing through one or more light emitting diodes that receive the rectified voltage not clipped by any TRIAC dimmer; and generate a sensing voltage based at least in part upon the light emitting diode current, the sensing voltage representing the light emitting diode current in magnitude; wherein the first current controller is further configured to: receive the sensing voltage from the second current controller; and generate a bleeder current based at least in part on the sensing voltage; wherein the first current controller is further configured to: if the light emitting diode current is larger than zero in magnitude, generate the bleeder current equal to zero in magnitude; and if the light emitting diode current is equal to zero in magnitude, generate the bleeder current larger than zero in magnitude; wherein the first current controller is further configured to, if the light emitting diode current is equal to zero in magnitude: increase the bleeder current with the increasing rectified voltage in magnitude; and decrease the bleeder current with the decreasing rectified voltage in magnitude; wherein a rectifier current generated by the rectifier is equal to a sum of the bleeder current and the light emitting diode current in magnitude; wherein, with the light emitting diode current being equal to zero in magnitude, the rectified voltage and the rectifier current contribute to an active power to increase the power factor of the LED lighting system without any TRIAC dimmer.

According to certain embodiments, a system for controlling a bleeder current to increase a power factor of an LED lighting system without any TRIAC dimmer includes: a first current controller configured to receive a rectified voltage generated by a rectifier that directly receives an AC input voltage without through any TRIAC dimmer; and a second current controller configured to: control a light emitting diode current flowing through one or more light emitting diodes that receive the rectified voltage not clipped by any TRIAC dimmer; and generate a sensing voltage based at least in part upon the light emitting diode current, the sensing voltage representing the light emitting diode current in magnitude; wherein the first current controller is further configured to: receive the sensing voltage from the second current controller; and generate a bleeder current based at least in part on the sensing voltage; wherein the first current controller is further configured to: if the light emitting diode current is larger than zero in magnitude, generate the bleeder current equal to zero in magnitude; and if the light emitting diode current is equal to zero in magnitude, generate the bleeder current larger than zero in magnitude; wherein the first current controller is further configured to, if the light emitting diode current is equal to zero in magnitude: increase the bleeder current with the increasing rectified voltage in magnitude; and decrease the bleeder current with the decreasing rectified voltage in magnitude; wherein a rectifier current generated by the rectifier is approximately equal to a sum of the bleeder current and the light emitting diode current in magnitude; wherein, with the light emitting diode current being equal to zero in magnitude, the rectified voltage and the rectifier current contribute to an active power to increase the power factor of the LED lighting system without any TRIAC dimmer.

According to some embodiments, a method for controlling a bleeder current to increase a power factor of an LED lighting system without any TRIAC dimmer includes: receiving a rectified voltage generated by a rectifier that directly receives an AC input voltage without through any TRIAC dimmer; controlling a light emitting diode current flowing through one or more light emitting diodes that receive the rectified voltage not clipped by any TRIAC dimmer; generating a sensing voltage based at least in part upon the light emitting diode current, the sensing voltage representing the light emitting diode current in magnitude; receiving the sensing voltage; and generating a bleeder current based at least in part on the sensing voltage; wherein the generating a bleeder current based at least in part on the sensing voltage includes: if the light emitting diode current is larger than zero in magnitude, generating the bleeder current equal to zero in magnitude; and if the light emitting diode current is equal to zero in magnitude, generating the bleeder current larger than zero in magnitude; wherein the generating the bleeder current larger than zero in magnitude if the light emitting diode current is equal to zero in magnitude includes: increasing the bleeder current with the increasing rectified voltage in magnitude; and decreasing the bleeder current with the decreasing rectified voltage in magnitude; wherein a rectifier current generated by the rectifier is equal to a sum of the bleeder current and the light emitting diode current in magnitude; wherein, with the light emitting diode current being equal to zero in magnitude, the rectified voltage and the rectifier current contribute to an active power to increase the power factor of the LED lighting system without any TRIAC dimmer.

According to certain embodiments, a method for controlling a bleeder current to increase a power factor of an LED lighting system without any TRIAC dimmer includes: receiving a rectified voltage generated by a rectifier that directly receives an AC input voltage without through any TRIAC dimmer; controlling a light emitting diode current flowing through one or more light emitting diodes that receive the rectified voltage not clipped by any TRIAC dimmer; generating a sensing voltage based at least in part upon the light emitting diode current, the sensing voltage representing the light emitting diode current in magnitude; receiving the sensing voltage; and generating a bleeder current based at least in part on the sensing voltage; wherein the generating a bleeder current based at least in part on the sensing voltage includes: if the light emitting diode current is larger than zero in magnitude, generating the bleeder current equal to zero in magnitude; and if the light emitting diode current is equal to zero in magnitude, generating the bleeder current larger than zero in magnitude; wherein the generating the bleeder current larger than zero in magnitude if the light emitting diode current is equal to zero in magnitude includes: increasing the bleeder current with the increasing rectified voltage in magnitude; and decreasing the bleeder current with the decreasing rectified voltage in magnitude; wherein a rectifier current generated by the rectifier is approximately equal to a sum of the bleeder current and the light emitting diode current in magnitude; wherein, with the light emitting diode current being equal to zero in magnitude, the rectified voltage and the rectifier current contribute to an active power to increase the power factor of the LED lighting system without any TRIAC dimmer.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for controlling power factors. Merely by way of example, some embodiments of the invention have been applied to light emitting diodes (LEDs). But it would be recognized that the invention has a much broader range of applicability.

Figure 1:
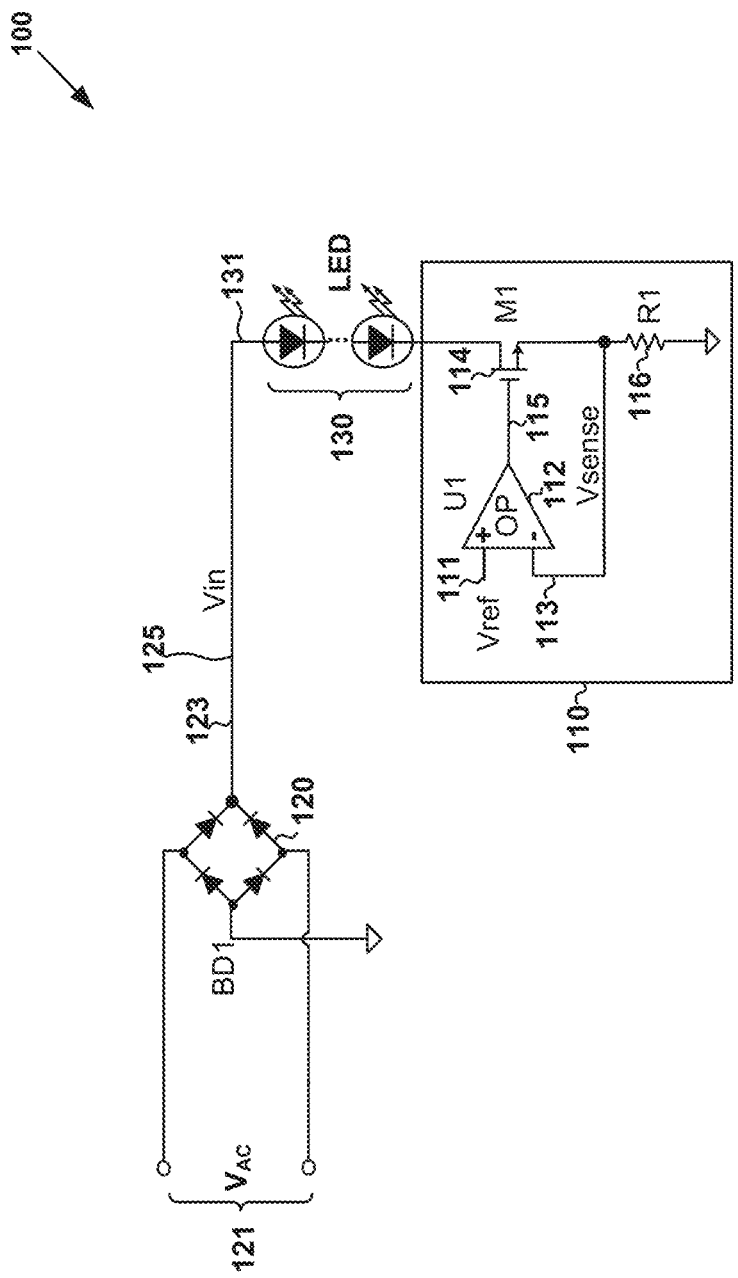
FIG. 1 is a simplified diagram showing a conventional LED lighting system without any Triode for Alternating Current (TRIAC) dimmer.
Figure 2:
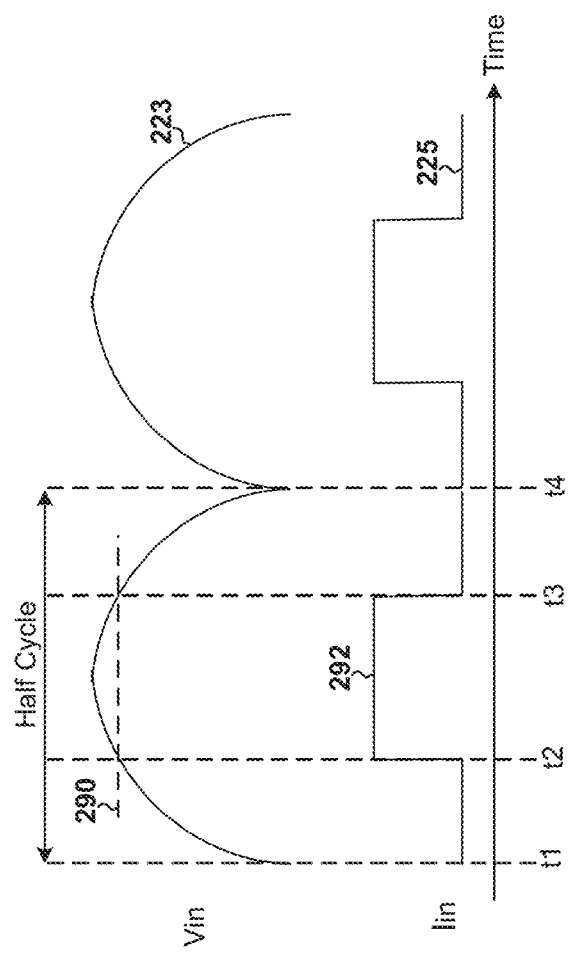
FIG. 2 shows simplified timing diagrams for the conventional LED lighting system without any TRIAC dimmer as shown in FIG. 1.
Figure 3:
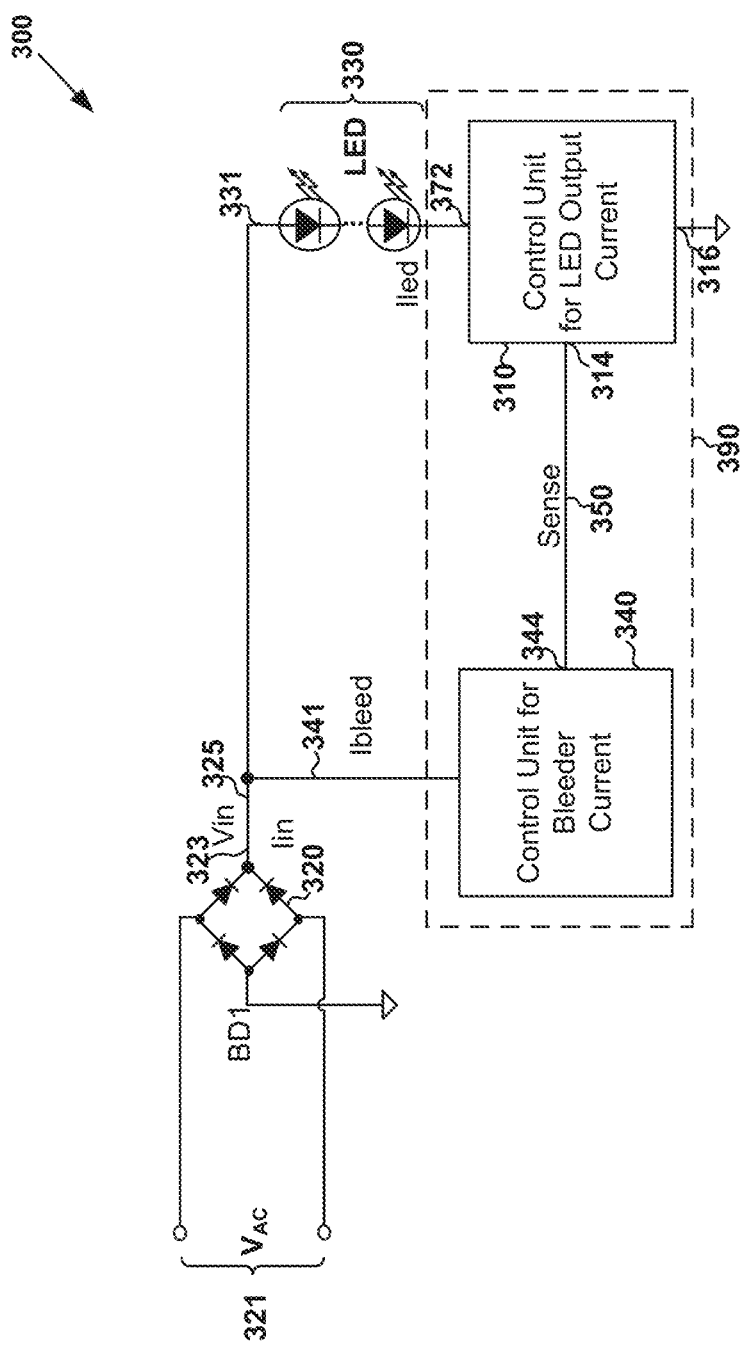
FIG. 3 is a simplified diagram showing an LED lighting system without any TRIAC dimmer according to certain embodiments of the present invention.

FIG. 3 is a simplified diagram showing an LED lighting system without any TRIAC dimmer according to certain embodiments of the present invention. This diagram is merely an example, which should not unduly limit the scope of the claims. One of ordinary skill in the art would recognize many variations, alternatives, and modifications. The LED lighting system 300 includes a rectifier 320 (e.g., BD1), one or more LEDs 330, and a controller 390, but the LED lighting system 300 does not include any TRIAC dimmer. As shown in FIG. 3, the controller 390 includes a control unit 310 for LED output current and a control unit 340) for bleeder current according to some embodiments. For example, the rectifier 320 (e.g., BD1) is a full wave rectifier. Although the above has been shown using a selected group of components for the LED lighting system 300, there can be many alternatives, modifications, and variations. For example, some of the components may be expanded and/or combined. Other components may be inserted to those noted above.

Depending upon the embodiment, the arrangement of components may be interchanged with others replaced. Further details of these components are found throughout the present specification.

As shown in FIG. 3, a current 331 (e.g., $I_{led}$) flows through the one or more LEDs 330, and the control unit 310 for LED output current is used to keep the current 331 (e.g., $I_{led}$) equal to a constant magnitude that is larger than zero during a duration of time according to certain embodiments. As an example, during another duration of time, the magnitude of the current 331 (e.g., $I_{led}$) is equal to zero, and the control unit 340 for bleeder current is used to generate a bleeder current 341 (e.g., $I_{bleed}$) that is larger than zero in magnitude.

According to some embodiments, the control unit 310 for LED output current includes terminals 312, 314 and 316, and the control unit 340) for bleeder current includes terminals 342 and 344. In certain examples, the terminal 314 of the control unit 310 for LED output current is connected to the terminal 344 of the control unit 340 for bleeder current. For example, the terminal 344 of the control unit 340) for bleeder current receives a sensing signal 350) (e.g., a sensing voltage) from the terminal 314 of the control unit 310 for LED output current. As an example, the sensing signal 350) (e.g., a sensing voltage) represents the current 331 (e.g., $I_{led}$), and the control unit 340 for bleeder current generates the bleeder current 341 (e.g., $I_{bleed}$) based at least in part on the sensing signal 350) (e.g., a sensing voltage). For example, the sensing signal 350) (e.g., a sensing voltage) is directly proportional to the current 331 (e.g., $I_{led}$) in magnitude. In some examples, the terminal 316 of the control unit 310 for LED output current is biased to a ground voltage.

In certain embodiments, the terminal 312 of the control unit 310 for LED output current is connected to a cathode of the one or more LEDs 330. In some examples, the terminal 342 of the control unit 340 for bleeder current is connected to an anode of the one or more LEDs 330. For example, both the terminal 342 of the control unit 340 for bleeder current and the anode of the one or more LEDs 330 receive a rectified voltage 323 (e.g., $V_{in}$) from the rectifier 320 (e.g., BD1). As an example, the rectified voltage 323 (e.g., $V_{in}$) is not clipped by any TRIAC dimmer. In certain examples, the rectifier 320 (e.g., BD1) also provides a current 325 (e.g., $I_{in}$). As an example, the current 325 (e.g., $I_{in}$) is determined as follows:

$$I_{in} = I_{led} + I_{bleed} \quad \text{(Equation 2)}$$

where $I_{in}$ represents the current 325. Additionally, $I_{led}$ represents the current 331, and $I_{bleed}$ represents the bleeder current 341. For example, with the current 331 (e.g., $I_{led}$) being equal to zero in magnitude, the rectified voltage 323 (e.g., $V_{in}$) that is larger than zero in magnitude and the current 325 (e.g., $I_{in}$) that is also larger than zero in magnitude contribute to the active power of the LED lighting system 300 to increase the power factor of the LED lighting system 300 without any TRIAC dimmer.

As shown in FIG. 3, after the LED lighting system 300 is powered on, an AC input voltage 321 (e.g., $V_{AC}$) is received directly by the rectifier 320 (e.g., BD1) without through any TRIAC dimmer according to some embodiments. For example, the rectifier 320 (e.g., BD1) rectifies the AC input voltage 321 (e.g., $V_{AC}$) and generates the rectified voltage 323 (e.g., $V_{in}$). As an example, the rectified voltage 323 (e.g., $V_{in}$) is used to control the current 331 (e.g., $I_{led}$) that flows through the one or more LEDs 330.

Figure 4:
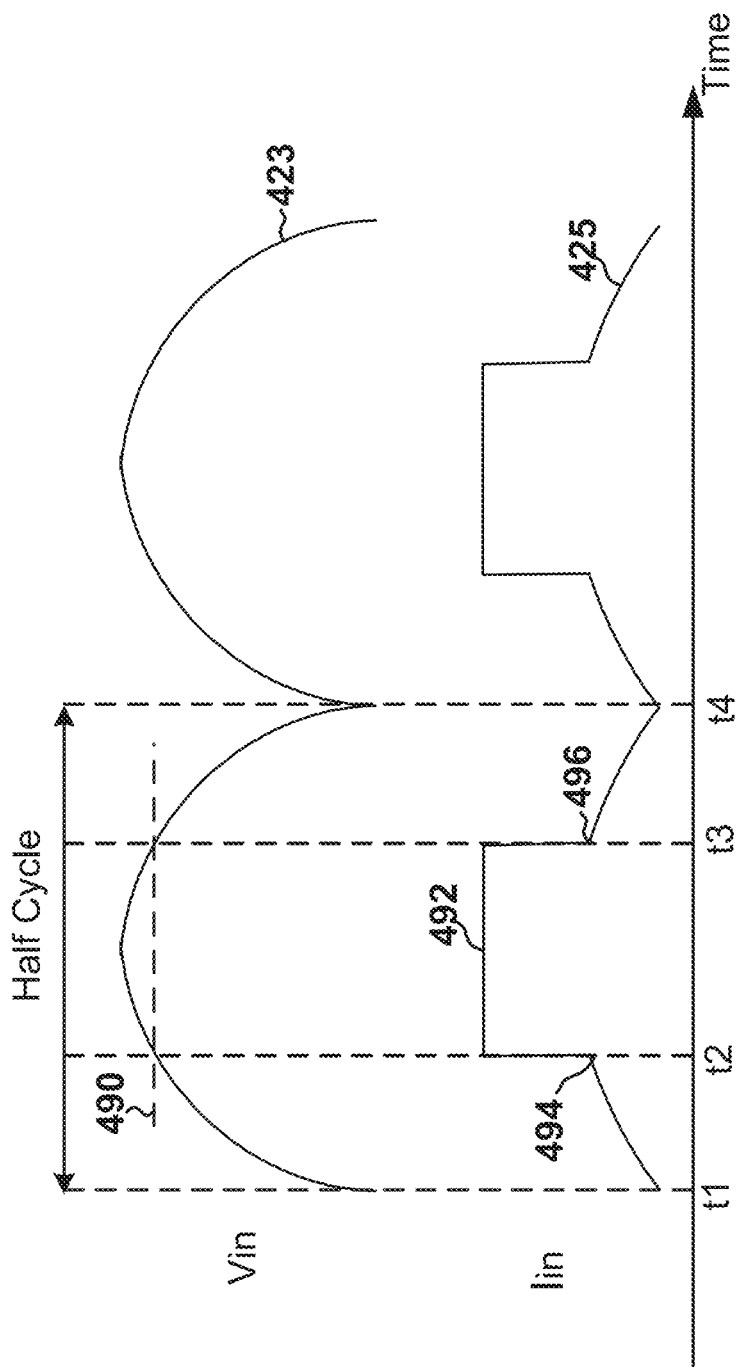
FIG. 4 shows simplified timing diagrams for the LED lighting system without any TRIAC dimmer as shown in FIG. 3 according to some embodiments of the present invention.

FIG. 4 shows simplified timing diagrams for the LED lighting system 300 without any TRIAC dimmer as shown in FIG. 3 according to some embodiments of the present invention. These diagrams are merely examples, which should not unduly limit the scope of the claims. One of ordinary skill in the art would recognize many variations, alternatives, and modifications. The waveform 423 represents the rectified voltage 323 (e.g., $V_{in}$) as a function of time, and the waveform 425 represents the current 325 (e.g., $I_{in}$) as a function of time.

According to certain embodiments, each cycle of the AC input voltage 321 (e.g., $V_{AC}$) includes two half cycles of the AC input voltage 321 (e.g., $V_{AC}$). For example, one half cycle of the AC input voltage 321 (e.g., $V_{AC}$) corresponds to one cycle of the rectified voltage 323 (e.g., $V_{in}$). As shown by the waveform 423, one half cycle of the AC input voltage 321 (e.g., $V_{AC}$) starts at time $t_1$, passes time $t_2$ and time $t_3$, and ends at time $t_4$ according to some embodiments. For example, at time $t_1$ and time $t_4$, the rectified voltage 323 (e.g., $V_{in}$) is equal to zero in magnitude. As an example, after time $t_1$ but before time $t_4$, the rectified voltage 323 (e.g., $V_{in}$) is larger than zero in magnitude during the entire duration from time $t_1$ and time $t_4$.

In some examples, from time $t_1$ to time $t_2$, the rectified voltage 323 (e.g., $V_{in}$) is larger than zero in magnitude after time $t_1$, but the rectified voltage 323 (e.g., $V_{in}$) remains smaller than a predetermined threshold voltage 490 as shown by the waveform 423. As an example, from time $t_1$ to time $t_2$, the current 325 (e.g., $I_{in}$) is larger than zero after time $t_1$. For example, from time $t_1$ to time $t_2$, the current 325 (e.g., $I_{in}$) changes with time (e.g., increases with time). As an example, from time $t_1$ to time $t_2$, the current 325 (e.g., $I_{in}$) increases (e.g., increases linearly) with the rectified voltage 323 (e.g., $V_{in}$). For example, from time $t_1$ to time $t_2$, the rectified voltage 323 (e.g., $V_{in}$) and the current 325 (e.g., $I_{in}$) contribute to the active power to increase the power factor of the LED lighting system 300 without any TRIAC dimmer.

In certain examples, from time $t_2$ to time $t_3$, the rectified voltage 323 (e.g., $V_{in}$) is larger than the predetermined threshold voltage 390, and the current 325 (e.g., $I_{in}$) is kept equal to a constant magnitude 492 that is larger than zero. For example, the predetermined threshold voltage 390 represents the minimum magnitude of the rectified voltage 323 (e.g., $V_{in}$) for the voltage across the one or more LEDs 330 to reach the forward threshold voltage of the one or more LEDs 330.

In some examples, from time $t_3$ to time $t_4$, the rectified voltage 323 (e.g., $V_{in}$) is larger than zero in magnitude before time $t_4$, but the rectified voltage 323 (e.g., $V_{in}$) remains smaller than the predetermined threshold voltage 490 as shown by the waveform 423. As an example, from time $t_3$ to time $t_4$, the current 325 (e.g., $I_{in}$) is larger than zero before time $t_4$. For example, from time $t_3$ to time $t_4$, the current 325 (e.g., $I_{in}$) changes with time (e.g., decreases with time). As an example, from time $t_3$ to time $t_4$, the current 325 (e.g., $I_{in}$) decreases (e.g., decreases linearly) with the rectified voltage 323 (e.g., $V_{in}$). For example, from time $t_3$ to time $t_4$, the rectified voltage 323 (e.g., $V_{in}$) and the current 325 (e.g., $I_{in}$) contribute to the active power to increase the power factor of the LED lighting system 300 without any TRIAC dimmer. According to certain embodiments, as shown by the waveform 425, at time $t_2$, the current 325 (e.g., $I_{in}$) rises from a magnitude 494 to the constant magnitude 492, and at time $t_3$, the current 325 (e.g., $I_{in}$) drops from the constant magnitude 492 to a magnitude 496. For example, the magnitude 494 and the magnitude 496 are equal.

In some embodiments, from time $t_1$ to time $t_2$, the current 331 (e.g., $I_{led}$) is equal to zero in magnitude, and the bleeder current 341 (e.g., $I_{bleed}$) is larger than zero after time $t_1$. For example, from time $t_1$ to time $t_2$, the bleeder current 341 (e.g., $I_{bleed}$) increases with the rectified voltage 323 (e.g., $V_{in}$). As an example, from time $t_1$ to time $t_2$, the bleeder current 341 (e.g., $I_{bleed}$) is directly proportional to the rectified voltage 323 (e.g., $V_{in}$). In certain embodiments, from time $t_2$ to time $t_3$, the current 331 (e.g., $I_{led}$) is larger than zero in magnitude, and the bleeder current 341 (e.g., $I_{bleed}$) is equal to zero in magnitude. In some embodiments, from time $t_3$ to time $t_4$, the current 331 (e.g., $I_{led}$) is equal to zero in magnitude, and the bleeder current 341 (e.g., $I_{bleed}$) is larger than zero before time $t_4$. For example, from time $t_3$ to time $t_4$, the bleeder current 341 (e.g., $I_{bleed}$) decreases with the rectified voltage 323 (e.g., $V_{in}$). As an example, from time $t_3$ to time $t_4$, the bleeder current 341 (e.g., $I_{bleed}$) is directly proportional to the rectified voltage 323 (e.g., $V_{in}$).

Figure 5:
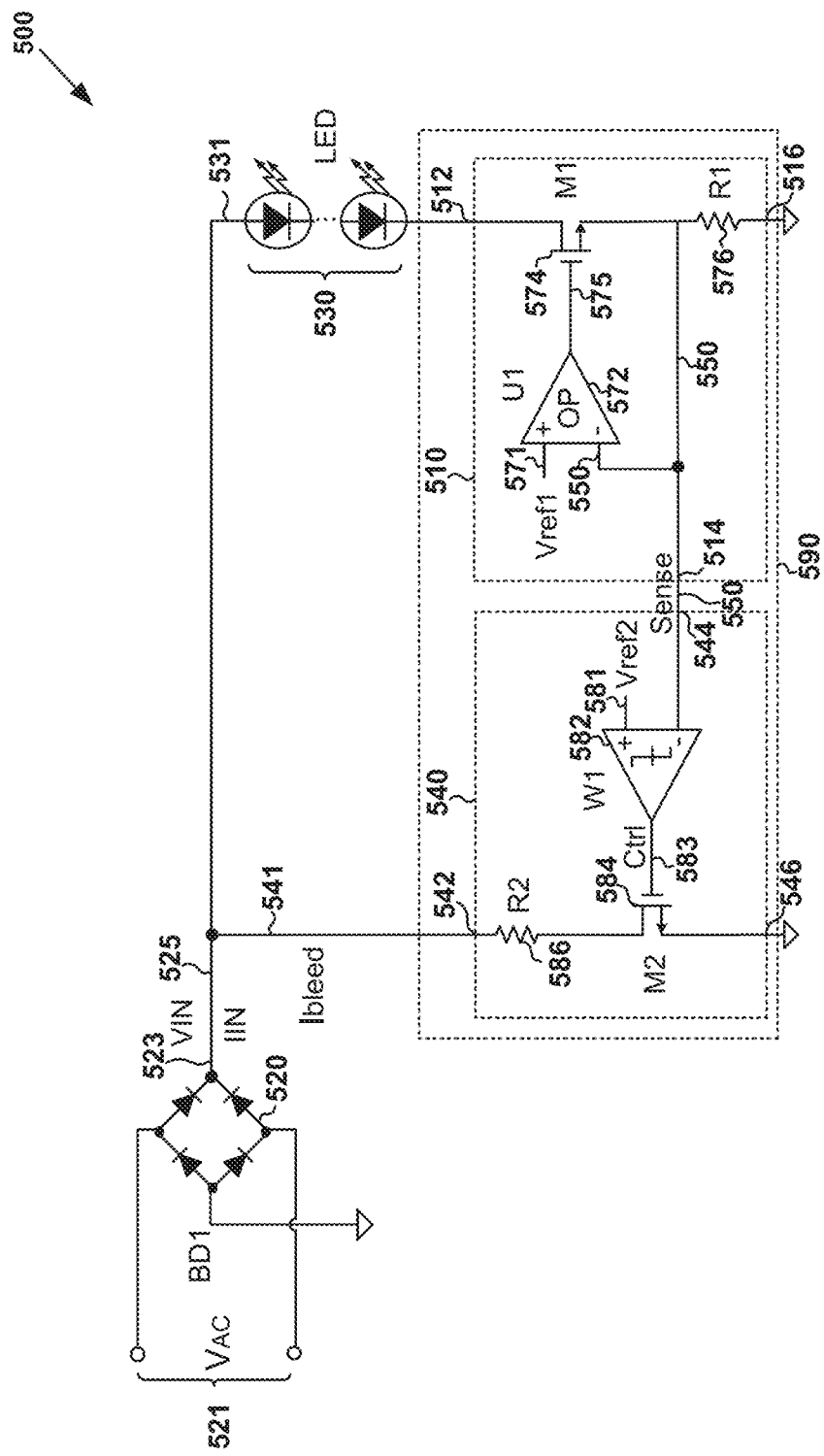
FIG. 5 is a simplified diagram showing an LED lighting system without any TRIAC dimmer according to some embodiments of the present invention.

FIG. 5 is a simplified diagram showing an LED lighting system without any TRIAC dimmer according to some embodiments of the present invention. This diagram is merely an example, which should not unduly limit the scope of the claims. One of ordinary skill in the art would recognize many variations, alternatives, and modifications. The LED lighting system 500 includes a rectifier 520 (e.g., BD1), one or more LEDs 530, and a controller 590, but the LED lighting system 500 does not include any TRIAC dimmer. As shown in FIG. 5, the controller 590 includes a control unit 510 for LED output current and a control unit 540) for bleeder current according to certain embodiments. In certain examples, the control unit 510 for LED output current includes an operational amplifier 572 (e.g., U1), a transistor 574 (e.g., M1), and a resistor 576 (e.g., R1). In some examples, the control unit 540 for bleeder current includes a comparator 582 (e.g., W1), a transistor 584 (e.g., M2), and a resistor 586 (e.g., R2). For example, the rectifier 520 (e.g., BD1) is a full wave rectifier. As an example, the transistor 574 (e.g., M1) is a field-effect transistor. Although the above has been shown using a selected group of components for the LED lighting system 500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the LED lighting system 500 is the same as the LED lighting system 300. For example, the rectifier 520 is the same as the rectifier 320, the one or more LEDs 530 are the same as the one or more LEDs 330, and the controller 590 is the same as the controller 390. As an example, the control unit 510 for LED output current is the same as the control unit 310 for LED output current, and the control unit 540) for bleeder current is the same as the control unit 340) for bleeder current.

As shown in FIG. 5, a current 531 (e.g., $I_{led}$) flows through the one or more LEDs 530, and the control unit 510 for LED output current is used to keep the current 531 (e.g., $I_{led}$) equal to a constant magnitude that is larger than zero during a duration of time according to some embodiments. As an example, during another duration of time, the magnitude of the current 531 (e.g., $I_{led}$) is equal to zero, and the control unit 540 for bleeder current is used to generate a bleeder current 541 (e.g., $I_{bleed}$) that is larger than zero in magnitude.

In some embodiments, the control unit 510 for LED output current includes terminals 512, 514 and 516, and the control unit 540 for bleeder current includes terminals 542, 544 and 546. In certain examples, the terminal 514 of the control unit 510 for LED output current is connected to the terminal 544 of the control unit 540 for bleeder current. For example, the terminal 544 of the control unit 540 for bleeder current receives a sensing signal 550 from the terminal 514 of the control unit 510 for LED output current. As an example, the sensing signal 550 represents the current 531 (e.g., $I_{led}$), and the control unit 540 for bleeder current generates the bleeder current 541 (e.g., $I_{bleed}$) based at least in part on the sensing signal 550. In some examples, the terminal 516 of the control unit 510 for LED output current and the terminal 546 of the control unit 540 for bleeder current are biased to a ground voltage. For example, the sensing voltage 550 is directly proportional to the current 531 (e.g., $I_{led}$) in magnitude, as follows:

$$V_{sense} = R_1 \times I_{led} \quad \text{(Equation 3)}$$

where $V_{sense}$ represents the sensing voltage 550, $R_1$ represents the resistance of the resistor 576, and $I_{led}$ represents the current 531 flowing through the one or more LEDs 530.

In certain embodiments, the terminal 512 of the control unit 510 for LED output current is connected to a cathode of the one or more LEDs 530. In some embodiments, the terminal 542 of the control unit 540 for bleeder current is connected to an anode of the one or more LEDs 530. For example, both the terminal 542 of the control unit 540 for bleeder current and the anode of the one or more LEDs 530 receive a rectified voltage 523 (e.g., $V_{in}$) from the rectifier 520 (e.g., BD1). As an example, the rectified voltage 523 (e.g., $V_{in}$) is not clipped by any TRIAC dimmer. In certain examples, the rectifier 520 (e.g., BD1) also provides a current 525 (e.g., $I_{in}$). As an example, the current 525 (e.g., $I_{in}$) is determined as follows:

$$I_{in} = I_{led} + I_{bleed} \quad \text{(Equation 4)}$$

where $I_{in}$ represents the current 525. Additionally, $I_{led}$ represents the current 531, and $I_{bleed}$ represents the bleeder current 541. For example, with the current 531 (e.g., $I_{led}$) being equal to zero in magnitude, the rectified voltage 523 (e.g., $V_{in}$) that is larger than zero in magnitude and the current 525 (e.g., $I_{in}$) that is also larger than zero in magnitude contribute to the active power of the LED lighting system 500 to increase the power factor of the LED lighting system 500 without any TRIAC dimmer.

According to some embodiments, the operational amplifier 572 (e.g., U1) includes a non-inverting input terminal (e.g., the "+" input terminal), an inverting input terminal (e.g., the "−" input terminal), and an output terminal. In certain examples, the non-inverting input terminal (e.g., the "+" input terminal) of the operational amplifier 572 (e.g., U1) receives a reference voltage 571 (e.g., $V_{ref1}$), and the inverting input terminal (e.g., the "−" input terminal) of the operational amplifier 572 (e.g., U1) receives the sensing signal 550 (e.g., a sensing voltage) from the source terminal of the transistor 574 (e.g., M1) and a terminal of the resistor 576 (e.g., $R_1$), which are connected to each other. For example, another terminal of the resistor 576 (e.g., $R_1$) is biased to the ground voltage through the terminal 516. In some examples, the transistor 574 (e.g., M1) also includes a drain terminal and a gate terminal. For example, the gate terminal of the transistor 574 (e.g., M1) is connected to the output terminal of the operational amplifier 572 (e.g., U1), and the drain terminal of the transistor 574 (e.g., M1) is connected to the cathode of the one or more LEDs 530 through the terminal 512.

According to certain embodiments, the comparator 582 (e.g., W1) includes a non-inverting input terminal (e.g., the "+" input terminal), an inverting input terminal (e.g., the "−" input terminal), and an output terminal. In some examples, the non-inverting input terminal (e.g., the "+" input terminal) of the comparator 582 (e.g., W1) receives a reference voltage 581 (e.g., $V_{ref2}$), and the inverting input terminal (e.g., the "−" input terminal) of the comparator 582 (e.g., W1) receives the sensing signal 550 (e.g., a sensing voltage) through the terminal 544. For example, the reference voltage 581 (e.g., $V_{ref2}$) is smaller than or equal to the reference voltage 571 (e.g., $V_{ref1}$). As an example, the output terminal of the comparator 582 (e.g., W1) is connected to a gate terminal of the transistor 584 (e.g., M2). In certain examples, the transistor 584 (e.g., M2) also includes a drain terminal and a source terminal. For example, the source terminal of the transistor 584 (e.g., M2) is biased to the ground voltage through the terminal 546. As an example, the drain terminal of the transistor 584 (e.g., M2) is connected to one terminal of the resistor 586 (e.g., R2), which includes another terminal configured to receive the rectified voltage 523 (e.g., $V_{in}$) through the terminal 542.

In some embodiments, after the LED lighting system 500 is powered on, an AC input voltage 521 (e.g., $V_{AC}$) is received directly by the rectifier 520 (e.g., BD1) without through any TRIAC dimmer according to some embodiments. For example, the rectifier 520 (e.g., BD1) rectifies the AC input voltage 521 (e.g., $V_{AC}$) and generates the rectified voltage 523 (e.g., $V_{in}$). As an example, the rectified voltage 523 (e.g., $V_{in}$) is used to control the current 531 (e.g., $I_{led}$) that flows through the one or more LEDs 530.

In certain embodiments, the output terminal of the comparator 582 (e.g., W1) sends a drive signal 583 (e.g., Ctrl) to the gate terminal of the transistor 584 (e.g., M2). In some examples, the drive signal 583 (e.g., Ctrl) is used to turn on or turn off the transistor 584 (e.g., M2) in order to control the bleeder current 541 (e.g., $I_{bleed}$). For example, if the transistor 584 (e.g., M2) is turned on, the magnitude of the bleeder current 541 (e.g., $I_{bleed}$) is larger than zero. As an example, if the transistor 584 (e.g., M2) is turned off, the magnitude of the bleeder current 541 (e.g., $I_{bleed}$) is equal to zero.

In certain examples, when the transistor 584 (e.g., M2) is turned on, if the on-resistance of the transistor 584 (e.g., M2) is much smaller than the resistance of the resistor 586 (e.g., R2), the magnitude of the bleeder current 541 (e.g., $I_{bleed}$) is determined as follows:

$$I_{bleed} \approx \frac{V_{in}}{R_2} \qquad \text{(Equation 5)}$$

where $I_{bleed}$ represents the bleeder current 541. Additionally, $V_{in}$ represents the rectified voltage 523, and R2 represents the resistance of the resistor 586. As an example, as shown in Equation 5, the bleeder current 541 (e.g., $I_{bleed}$) is within 1% of the ratio of the rectified voltage 523 (e.g., $V_{in}$) to the resistance of the resistor 586 (e.g., R2). For example, as shown in Equation 5, when the transistor 584 (e.g., M2) is turned on, the magnitude of the bleeder current 541 (e.g., $I_{bleed}$) is approximately determined by the resistance of the resistor 586 and the magnitude of the rectified voltage 523. As an example, when the transistor 584 (e.g., M2) is turned on, the bleeder current 541 (e.g., $I_{bleed}$) is approximately directly proportional to the rectified voltage 523 (e.g., $V_{in}$).

As mentioned above and further emphasized here, FIG. 5 is merely an example, which should not unduly limit the scope of the claims. One of ordinary skill in the art would recognize many variations, alternatives, and modifications. For example, the transistor 574 is a bipolar junction transistor. As an example, the resistance of the resistor 586 (e.g., R2) is adjusted in order to control the magnitude of the bleeder current 541 (e.g., $I_{bleed}$) with the same rectified voltage 523 and to achieve the desired power factor for the LED lighting system 500.

Figure 6:
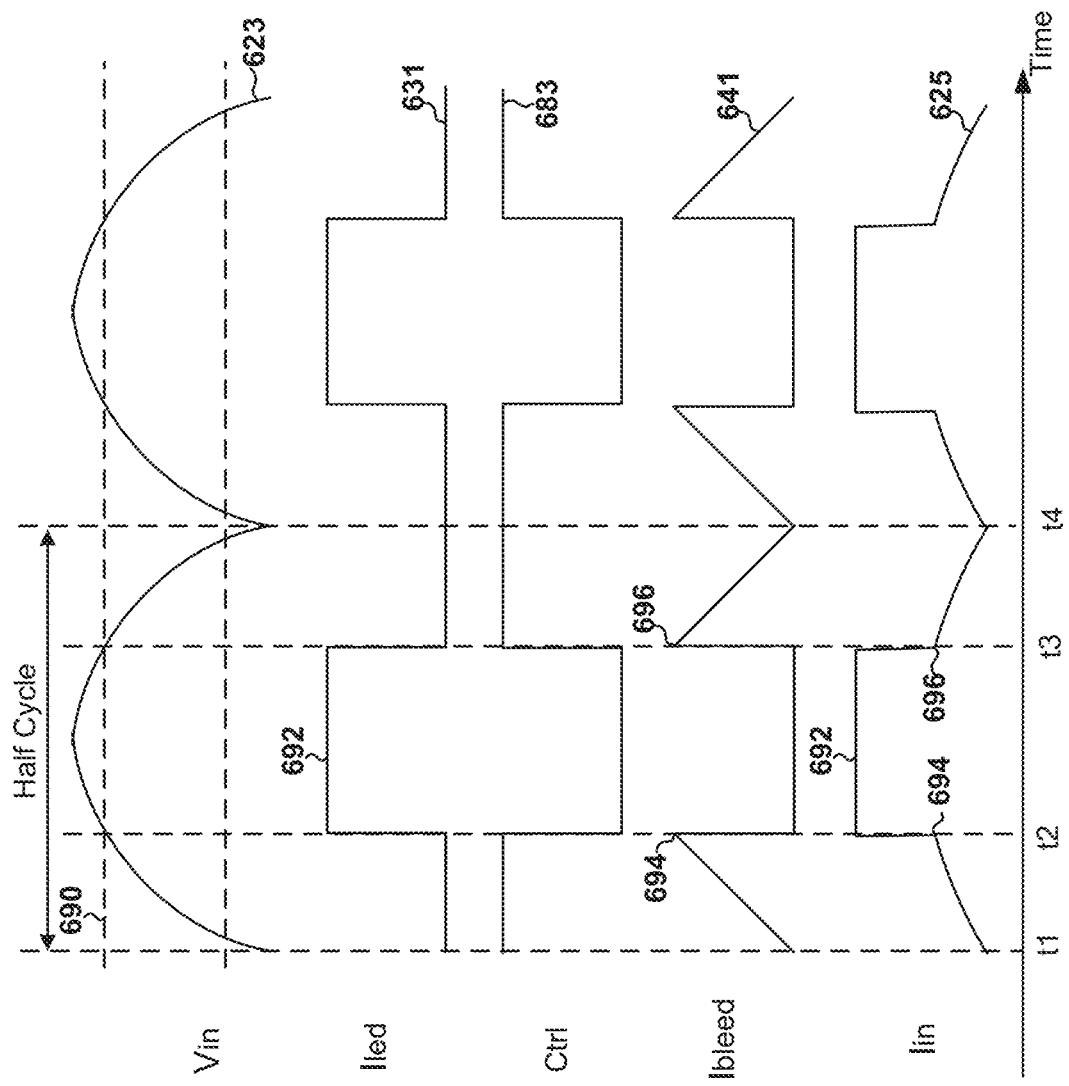
FIG. 6 shows simplified timing diagrams for the LED lighting system without any TRIAC dimmer as shown in FIG. 5 according to some embodiments of the present invention.

FIG. 6 shows simplified timing diagrams for the LED lighting system 500 without any TRIAC dimmer as shown in FIG. 5 according to some embodiments of the present invention. These diagrams are merely examples, which should not unduly limit the scope of the claims. One of ordinary skill in the art would recognize many variations, alternatives, and modifications. The waveform 623 represents the rectified voltage 523 (e.g., $V_{in}$) as a function of time, the waveform 631 represents the current 531 (e.g., $I_{led}$) as a function of time, the waveform 683 represents the drive signal 583 (e.g., Ctrl) as a function of time, the waveform 641 represents the bleeder current 541 (e.g., $I_{bleed}$) as a function of time, and the waveform 625 represents the current 525 (e.g., $I_{in}$) as a function of time.

According to certain embodiments, each cycle of the AC input voltage 521 (e.g., $V_{AC}$) includes two half cycles of the AC input voltage 521 (e.g., $V_{AC}$). For example, one half cycle of the AC input voltage 521 (e.g., $V_{AC}$) corresponds to one cycle of the rectified voltage 523 (e.g., $V_{in}$). As shown by the waveform 623, one half cycle of the AC input voltage 521 (e.g., $V_{AC}$) starts at time $t_1$, passes time $t_2$ and time $t_3$, and ends at time $t_4$ according to some embodiments. For example, at time $t_1$ and time $t_4$, the rectified voltage 523 (e.g., $V_{in}$) is equal to zero in magnitude. As an example, after time $t_1$ but before time $t_4$, the rectified voltage 523 (e.g., $V_{in}$) is larger than zero in magnitude during the entire duration from time $t_1$ and time $t_4$.

In some examples, from time $t_1$ to time $t_2$, the rectified voltage 523 (e.g., $V_{in}$) is larger than zero in magnitude after time $t_1$, but the rectified voltage 523 (e.g., $V_{in}$) is smaller than a predetermined threshold voltage 690 as shown by the waveform 623. As an example, from time $t_1$ to time $t_2$, the current 531 (e.g., $I_{led}$) is equal to zero as shown by the waveform 631. For example, from time $t_1$ to time $t_2$, the sensing signal 550 (e.g., a sensing voltage) is equal to zero in magnitude, the comparator 582 (e.g., W1) generates the drive signal 583 (e.g., Ctrl) at a logic high level to turn on the transistor 584 (e.g., M2) as shown by the waveform 683, and the magnitude of the bleeder current 541 (e.g., $I_{bleed}$) is determined according to Equation 5. As an example, from time $t_1$ to time $t_2$, the bleeder current 541 (e.g., $I_{bleed}$) is larger than zero after time $t_1$. For example, from time $t_1$ to time $t_2$, the magnitude of the bleeder current 541 (e.g., $I_{bleed}$) increases with the rectified voltage 523 (e.g., $V_{in}$) and reaches a magnitude 694 at time $t_2$ as shown by the waveforms 623 and 641. As an example, from time $t_1$ to time $t_2$, the bleeder current 541 (e.g., $I_{bleed}$) is directly proportional to the rectified voltage 523 (e.g., $V_{in}$). For example, from time $t_1$ to time $t_2$, the magnitude of the current 525 (e.g., $I_{in}$), which is equal to the magnitude of the bleeder current 541 (e.g., $I_{bleed}$), is larger than zero after time $t_1$. As an example, from time $t_1$ to time $t_2$, the magnitude of the current 525 (e.g., $I_{in}$) increases with the rectified voltage 523 (e.g., $V_{in}$) and reaches the magnitude 694 at time $t_2$ as shown by the waveforms 623 and 625. For example, from time $t_1$ to time $t_2$, the rectified voltage 523 (e.g., $V_{in}$) and the current 525 (e.g., $I_{in}$) contribute to the active power to increase the power factor of the LED lighting system 500 without any TRIAC dimmer.

According to some embodiments, at time $t_2$, the rectified voltage 523 (e.g., $V_{in}$) becomes larger than the predetermined threshold voltage 690 as shown by the waveform 623, and the current 531 (e.g., $I_{led}$) becomes larger than zero and reaches a magnitude 692 that is larger than zero as shown by the waveform 631. For example, at time $t_2$, if the current 531 (e.g., $I_{led}$) reaches the magnitude 692, the sensing signal 550) (e.g., a sensing voltage) becomes larger than the reference voltage 581 (e.g., $V_{ref2}$), the comparator 582 (e.g., W1) changes the drive signal 583 (e.g., Ctrl) from the logic high level to a logic low level to turn off the transistor 584 (e.g., M2) as shown by the waveform 683, and the magnitude of the bleeder current 541 (e.g., $I_{bleed}$) decreases from the magnitude 694 and drops to zero as shown by the waveform 641. As an example, at time $t_2$, the magnitude of the current 525 (e.g., $I_{in}$) changes from being equal to the magnitude of the bleeder current 541 (e.g., $I_{bleed}$) to being equal to the magnitude of the current 531 (e.g., $I_{led}$) as shown by the waveform 625.

In certain embodiments, from time $t_2$ to time $t_3$, the rectified voltage 523 (e.g., $V_{in}$) remains larger than the predetermined threshold voltage 690 as shown by the waveform 623, the current 531 (e.g., $I_{led}$) remains equal to the magnitude 692 that is larger than zero as shown by the waveform 631, the drive signal 583 (e.g., Ctrl) remains at the logic low level as shown by the waveform 683, the bleeder current 541 (e.g., $I_{bleed}$) remains equal to zero in magnitude as shown by the waveform 641, and the current 525 (e.g., $I_{in}$) remains equal to the current 531 (e.g., $I_{led}$) in magnitude as shown by the waveform 625.

In some embodiments, at time $t_3$, the rectified voltage 523 (e.g., $V_{in}$) becomes smaller than the predetermined threshold voltage 690 as shown by the waveform 623, and the current 531 (e.g., $I_{led}$) decreases from the magnitude 692 and drops to zero in magnitude as shown by the waveform 631. For example, at time $t_3$, if the current 531 (e.g., $I_{led}$) drops to zero in magnitude, the sensing signal 550) (e.g., a sensing voltage) becomes smaller than the reference voltage 581 (e.g., $V_{ref2}$), the comparator 582 (e.g., W1) changes the drive signal 583 (e.g., Ctrl) from the logic low level to the logic high level to turn on the transistor 584 (e.g., M2) as shown by the waveform 683, and the magnitude of the bleeder current 541 (e.g., $I_{bleed}$) becomes larger than zero and reaches a magnitude 696 as shown by the waveform 641. As an example, at time $t_3$, the magnitude of the current 525 (e.g., $I_{in}$) changes from being equal to the magnitude of the current 531 (e.g., $I_{led}$) to being equal to the magnitude of the bleeder current 541 (e.g., $I_{bleed}$) as shown by the waveform 625.

According to certain embodiments, from time $t_3$ to time $t_4$, the rectified voltage 523 (e.g., $V_{in}$) is larger than zero in magnitude before time $t_4$, but the rectified voltage 523 (e.g., $V_{in}$) is smaller than the predetermined threshold voltage 690 as shown by the waveform 623. As an example, from time $t_3$ to time $t_4$, the current 531 (e.g., $I_{led}$) is equal to zero as shown by the waveform 631. For example, from time $t_3$ to time $t_4$, the sensing signal 550) (e.g., a sensing voltage) is equal to zero in magnitude, the comparator 582 (e.g., W1) generates the drive signal 583 (e.g., Ctrl) at the logic high level to turn on the transistor 584 (e.g., M2) as shown by the waveform 683, and the magnitude of the bleeder current 541 (e.g., $I_{bleed}$) is determined according to Equation 5. As an example, from time $t_3$ to time $t_4$, the bleeder current 541 (e.g., $I_{bleed}$) is larger than zero before time $t_4$. For example, from time $t_3$ to time $t_4$, the magnitude of the bleeder current 541 (e.g., $I_{bleed}$) decreases with the rectified voltage 523 (e.g., $V_{in}$) from the magnitude 696 as shown by the waveforms 623 and 641. As an example, from time $t_3$ to time $t_4$, the bleeder current 541 (e.g., $I_{bleed}$) is directly proportional to the rectified voltage 523 (e.g., $V_{in}$). For example, from time $t_3$ to time $t_4$, the magnitude of the current 525 (e.g., $I_{in}$), which is equal to the magnitude of the bleeder current 541 (e.g., $I_{bleed}$), is larger than zero before time $t_4$. As an example, from time $t_3$ to time $t_4$, the magnitude of the current 525 (e.g., $I_{in}$) decreases with the rectified voltage 523 (e.g., $V_{in}$) from the magnitude 696 as shown by the waveforms 623 and 625. For example, from time $t_3$ to time $t_4$, the rectified voltage 523 (e.g., $V_{in}$) and the current 525 (e.g., $I_{in}$) contribute to the active power to increase the power factor of the LED lighting system 500 without any TRIAC dimmer.

Figure 7:
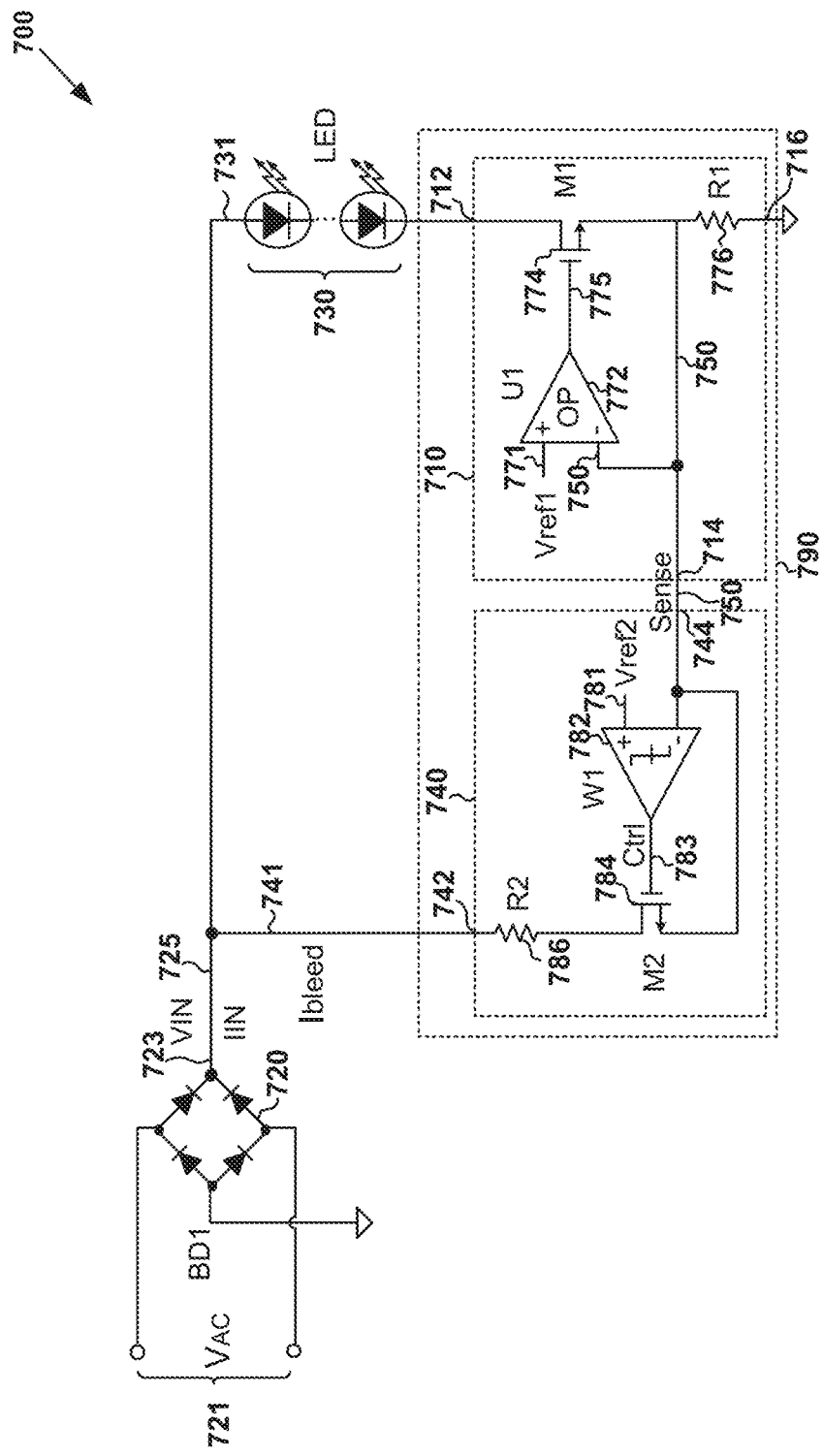
FIG. 7 is a simplified diagram showing an LED lighting system without any TRIAC dimmer according to some embodiments of the present invention.

FIG. 7 is a simplified diagram showing an LED lighting system without any TRIAC dimmer according to some embodiments of the present invention. This diagram is merely an example, which should not unduly limit the scope of the claims. One of ordinary skill in the art would recognize many variations, alternatives, and modifications.

The LED lighting system 700 includes a rectifier 720 (e.g., BD1), one or more LEDs 730, and a controller 790, but the LED lighting system 700 does not include any TRIAC dimmer. As shown in FIG. 7, the controller 790 includes a control unit 710 for LED output current and a control unit 740 for bleeder current according to certain embodiments. In certain examples, the control unit 710 for LED output current includes an operational amplifier 772 (e.g., U1), a transistor 774 (e.g., M1), and a resistor 776 (e.g., R1). In some examples, the control unit 740 for bleeder current includes an operational amplifier 782 (e.g., U2), a transistor 784 (e.g., M2), and a resistor 786 (e.g., R2). For example, the rectifier 720 (e.g., BD1) is a full wave rectifier. As an example, the transistor 774 (e.g., M1) is a field-effect transistor. Although the above has been shown using a selected group of components for the LED lighting system 700, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the LED lighting system 700 is the same as the LED lighting system 300. For example, the rectifier 720 is the same as the rectifier 320, the one or more LEDs 730 are the same as the one or more LEDs 330, and the controller 790 is the same as the controller 390. As an example, the control unit 710 for LED output current is the same as the control unit 310 for LED output current, and the control unit 740 for bleeder current is the same as the control unit 340 for bleeder current.

As shown in FIG. 7, a current 731 (e.g., $I_{led}$) flows through the one or more LEDs 730, and the control unit 710 for LED output current is used to keep the current 731 (e.g., $I_{led}$) equal to a constant magnitude that is larger than zero during a duration of time according to some embodiments. As an example, during another duration of time, the magnitude of the current 731 (e.g., $I_{led}$) is equal to zero, and the control unit 740 for bleeder current is used to generate a bleeder current 741 (e.g., $I_{bleed}$) that is larger than zero in magnitude.

In some embodiments, the control unit 710 for LED output current includes terminals 712, 714 and 716, and the control unit 740 for bleeder current includes terminals 742 and 744. In certain examples, the terminal 714 of the control unit 710 for LED output current is connected to the terminal 744 of the control unit 740 for bleeder current. For example, the terminal 744 of the control unit 740 for bleeder current receives a sensing signal 750 from the terminal 714 of the control unit 710 for LED output current. As an example, the sensing signal 750 represents the current 731 (e.g., $I_{led}$), and the control unit 740 for bleeder current generates the bleeder current 741 (e.g., $I_{bleed}$) based at least in part on the sensing signal 750). In some examples, the terminal 716 of the control unit 710 for LED output current is biased to a ground voltage. For example, the sensing voltage 750 is directly proportional to the current 731 (e.g., $I_{led}$) in magnitude, as follows:

$$V_{sense} = R_1 \times I_{led} \quad \text{(Equation 6)}$$

where $V_{sense}$ represents the sensing voltage 750. $R_1$ represents the resistance of the resistor 776, and $I_{led}$ represents the current 731 flowing through the one or more LEDs 830.

In certain embodiments, the terminal 712 of the control unit 710 for LED output current is connected to a cathode of the one or more LEDs 730. In some embodiments, the terminal 742 of the control unit 740) for bleeder current is connected to an anode of the one or more LEDs 730. For example, both the terminal 742 of the control unit 740 for bleeder current and the anode of the one or more LEDs 730 receive a rectified voltage 723 (e.g., $V_{in}$) from the rectifier 720 (e.g., BD1). As an example, the rectified voltage 723 (e.g., $V_{in}$) is not clipped by any TRIAC dimmer. In certain examples, the rectifier 720 (e.g., BD1) also provides a current 725 (e.g., $I_{in}$). As an example, the current 725 (e.g., $I_{in}$) is determined as follows:

$$I_{in} = I_{led} + I_{bleed} \qquad \text{(Equation 7)}$$

where $I_{in}$ represents the current 725. Additionally, $I_{led}$ represents the current 731, and $I_{bleed}$ represents the bleeder current 741 flowing through the one or more LEDs 730. For example, with the current 731 (e.g., $I_{led}$) being equal to zero in magnitude, the rectified voltage 723 (e.g., $V_{in}$) that is larger than zero in magnitude and the current 725 (e.g., $I_{in}$) that is also larger than zero in magnitude contribute to the active power of the LED lighting system 700 to increase the power factor of the LED lighting system 700 without any TRIAC dimmer.

According to some embodiments, the operational amplifier 772 (e.g., U1) includes a non-inverting input terminal (e.g., the "+" input terminal), an inverting input terminal (e.g., the "−" input terminal), and an output terminal. In certain examples, the non-inverting input terminal (e.g., the "+" input terminal) of the operational amplifier 772 (e.g., U1) receives a reference voltage 771 (e.g., $V_{ref1}$), and the inverting input terminal (e.g., the "−" input terminal) of the operational amplifier 772 (e.g., U1) receives the sensing signal 750) (e.g., a sensing voltage) from the source terminal of the transistor 774 (e.g., M1) and a terminal of the resistor 776 (e.g., $R_1$), which are connected to each other. For example, another terminal of the resistor 776 (e.g., $R_1$) is biased to the ground voltage through the terminal 716. In some examples, the transistor 774 (e.g., M1) also includes a drain terminal and a gate terminal. For example, the gate terminal of the transistor 774 (e.g., M1) is connected to the output terminal of the operational amplifier 772 (e.g., U1), and the drain terminal of the transistor 774 (e.g., M1) is connected to the cathode of the one or more LEDs 730 through the terminal 712.

According to certain embodiments, the operational amplifier 782 (e.g., U2) includes a non-inverting input terminal (e.g., the "+" input terminal), an inverting input terminal (e.g., the "−" input terminal), and an output terminal. In some examples, the non-inverting input terminal (e.g., the "+" input terminal) of the operational amplifier 782 (e.g., U2) receives a reference voltage 781 (e.g., $V_{ref2}$), and the inverting input terminal (e.g., the "−" input terminal) of the operational amplifier 782 (e.g., U2) receives the sensing signal 750) (e.g., a sensing voltage) through the terminal 744. For example, the reference voltage 781 (e.g., $V_{ref2}$) is smaller than the reference voltage 771 (e.g., $V_{ref1}$). As an example, the output terminal of the operational amplifier 782 (e.g., U2) is connected to a gate terminal of the transistor 784 (e.g., M2). In certain examples, the transistor 784 (e.g., M2) also includes a drain terminal and a source terminal. For example, the source terminal of the transistor 784 (e.g., M2) receives the sensing signal 750 (e.g., a sensing voltage) through the terminal 744. As an example, the drain terminal of the transistor 784 (e.g., M2) is connected to one terminal of the resistor 786 (e.g., R2), which includes another terminal configured to receive the rectified voltage 723 (e.g., $V_{in}$) through the terminal 742.

In some embodiments, after the LED lighting system 700 is powered on, an AC input voltage 721 (e.g., $V_{AC}$) is received directly by the rectifier 720 (e.g., BD1) without through any TRIAC dimmer according to some embodiments. For example, the rectifier 720 (e.g., BD1) rectifies the AC input voltage 721 (e.g., $V_{AC}$) and generates the rectified voltage 723 (e.g., $V_{in}$). As an example, the rectified voltage 723 (e.g., $V_{in}$) is used to control the current 731 (e.g., $I_{led}$) that flows through the one or more LEDs 730.

In certain embodiments, the output terminal of the operational amplifier 782 (e.g., U2) sends a drive signal 783 to the gate terminal of the transistor 784 (e.g., M2). In some examples, the drive signal 783 is used to turn on or turn off the transistor 784 (e.g., M2) in order to control the bleeder current 741 (e.g., $I_{bleed}$). For example, if the transistor 784 (e.g., M2) is turned on, the magnitude of the bleeder current 741 (e.g., $I_{bleed}$) is larger than zero. As an example, if the transistor 784 (e.g., M2) is turned off, the magnitude of the bleeder current 741 (e.g., $I_{bleed}$) is equal to zero.

In certain examples, when the transistor 784 (e.g., M2) is turned on, if the on-resistance of the transistor 784 (e.g., M2) and the resistance of the resistor 776 (e.g., $R_1$) are each much smaller than the resistance of the resistor 786 (e.g., R2), the magnitude of the bleeder current 741 (e.g., $I_{bleed}$) is determined as follows:

$$I_{bleed} \approx \frac{V_{in}}{R_2} \qquad \text{(Equation 8)}$$

where $I_{bleed}$ represents the bleeder current 741. Additionally, $V_{in}$ represents the rectified voltage 723, and R2 represents the resistance of the resistor 786. As an example, as shown in Equation 8, the bleeder current 741 (e.g., $I_{bleed}$) is within 1% of the ratio of the rectified voltage 723 (e.g., $V_{in}$) to the resistance of the resistor 786 (e.g., R2). For example, as shown in Equation 8, when the transistor 784 (e.g., M2) is turned on, the magnitude of the bleeder current 741 (e.g., $I_{bleed}$) is approximately determined by the resistance of the resistor 786 and the magnitude of the rectified voltage 723. As an example, when the transistor 784 (e.g., M2) is turned on, the bleeder current 741 (e.g., $I_{bleed}$) is approximately directly proportional to the rectified voltage 723 (e.g., $V_{in}$).

According to some embodiments, the source terminal of the transistor 784 (e.g., M2) receives the sensing signal 750 (e.g., a sensing voltage) through the terminal 744 to form a feedback loop. In some examples, with the feedback loop, if the rectified voltage 723 (e.g., $V_{in}$) becomes larger than a predetermined threshold voltage, the current 731 (e.g., $I_{led}$), the drive signal 783, the bleeder current 741, and the current 725 (e.g., $I_{in}$) changes more smoothly than without the feedback loop, where the predetermined threshold voltage represents, for example, the minimum magnitude of the rectified voltage 723 (e.g., $V_{in}$) for the voltage across the one or more LEDs 730 to reach the forward threshold voltage of the one or more LEDs 730. As an example, with the feedback loop, if the rectified voltage 723 (e.g., $V_{in}$) becomes smaller than the predetermined threshold voltage, the current 731 (e.g., $I_{led}$), the drive signal 783, the bleeder current 741, and the current 725 (e.g., $I_{in}$) changes more smoothly than without the feedback loop, where the predetermined threshold voltage represents, for example, the minimum magnitude of the rectified voltage 723 (e.g., $V_{in}$) for the voltage across the one or more LEDs 730 to reach the forward threshold voltage of the one or more LEDs 730.

As mentioned above and further emphasized here. FIG. 7 is merely an example, which should not unduly limit the scope of the claims. One of ordinary skill in the art would recognize many variations, alternatives, and modifications. For example, the transistor 774 is a bipolar junction transistor. As an example, the resistance of the resistor 786 (e.g., R2) is adjusted in order to control the magnitude of the bleeder current 741 (e.g., $I_{bleed}$) with the same rectified voltage 723 and to achieve the desired power factor for the LED lighting system 700.

Figure 8:
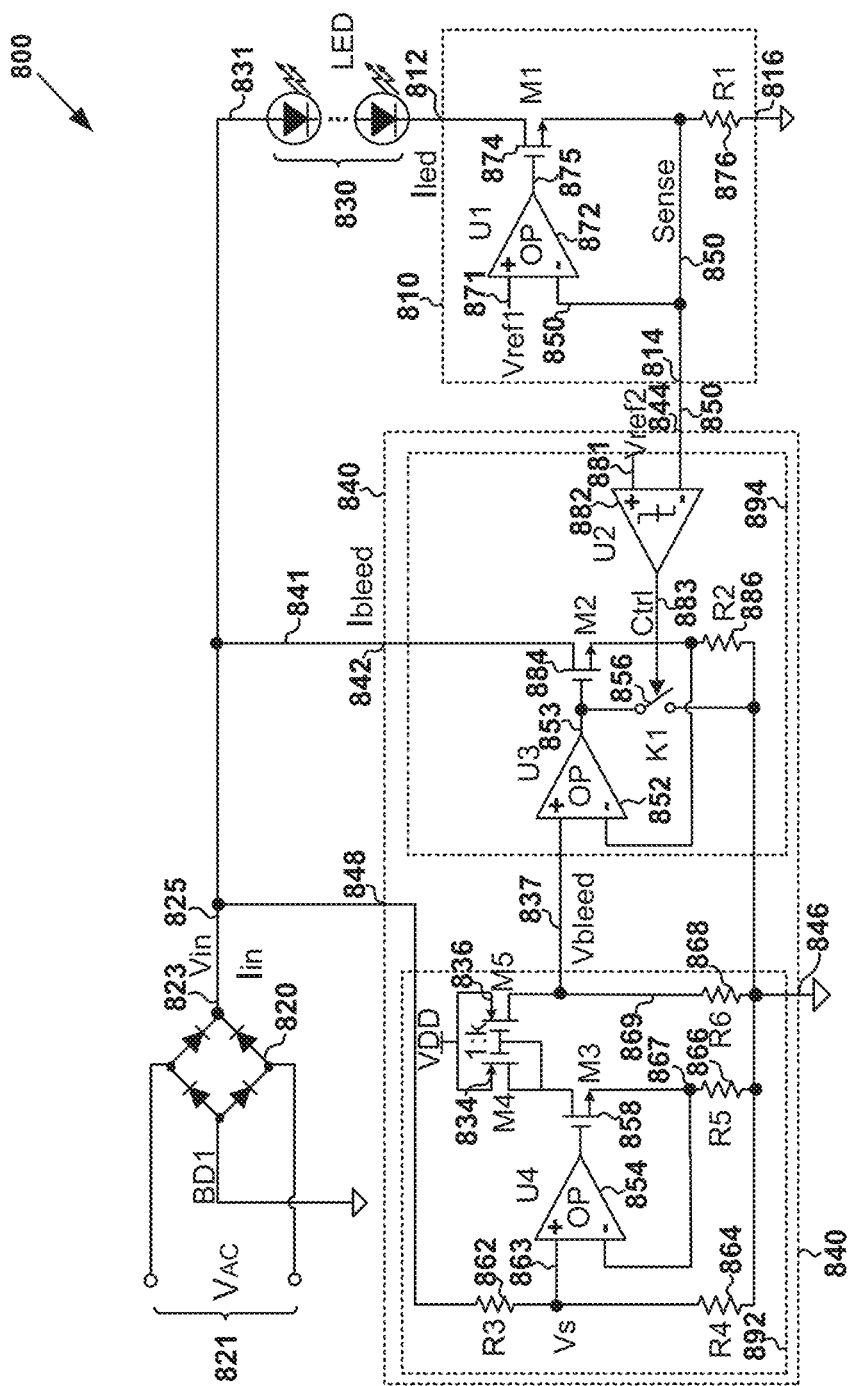
FIG. 8 is a simplified diagram showing an LED lighting system without any TRIAC dimmer according to certain embodiments of the present invention.

FIG. 8 is a simplified diagram showing an LED lighting system without any TRIAC dimmer according to certain embodiments of the present invention. This diagram is merely an example, which should not unduly limit the scope of the claims. One of ordinary skill in the art would recognize many variations, alternatives, and modifications. The LED lighting system 800 includes a rectifier 820 (e.g., BD1), one or more LEDs 830, a control unit 810 for LED output current, and a control unit 840 for bleeder current, but the LED lighting system 800 does not include any TRIAC dimmer. As shown in FIG. 8, the control unit 810) for LED output current and the control unit 840 for bleeder current are parts of a controller according to certain embodiments. In certain examples, the control unit 810 for LED output current includes an operational amplifier 872 (e.g., U1), a transistor 874 (e.g., M1), and a resistor 876 (e.g., $R_1$). In some examples, the control unit 840 for bleeder current includes an operational amplifier 852 (e.g., U3), an operational amplifier 854 (e.g., U4), a switch 856 (e.g., K1), a comparator 882 (e.g., W2), a transistor 884 (e.g., M2), a transistor 858 (e.g., M3), a transistor 834 (e.g., M4), a transistor 836 (e.g., M5), a resistor 886 (e.g., R2), a resistor 862 (e.g., R3), a resistor 864 (e.g., R4), a resistor 866 (e.g., R5), and a resistor 868 (e.g., R6). For example, the rectifier 820 (e.g., BD1) is a full wave rectifier. As an example, the transistor 874 (e.g., M1) is a field-effect transistor. Although the above has been shown using a selected group of components for the LED lighting system 800, there can be many alternatives, modifications, and variations. For example, some of the components may be expanded and/or combined. Other components may be inserted to those noted above.

Depending upon the embodiment, the arrangement of components may be interchanged with others replaced. Further details of these components are found throughout the present specification.

In certain embodiments, the LED lighting system 800 is the same as the LED lighting system 300. For example, the rectifier 820 is the same as the rectifier 320, the one or more LEDs 830 are the same as the one or more LEDs 330, the control unit 810 for LED output current is the same as the control unit 310 for LED output current, and the control unit 840) for bleeder current is the same as the control unit 340) for bleeder current.

As shown in FIG. 8, a current 831 (e.g., $I_{led}$) flows through the one or more LEDs 830, and the control unit 810 for LED output current is used to keep the current 831 (e.g., $I_{led}$) equal to a constant magnitude that is larger than zero during a duration of time according to some embodiments. As an example, during another duration of time, the magnitude of the current 831 (e.g., $I_{led}$) is equal to zero, and the control unit 840 for bleeder current is used to generate a bleeder current 841 (e.g. $I_{bleed}$) that is larger than zero in magnitude.

In some embodiments, the control unit 810 for LED output current includes terminals 812, 814 and 816, and the control unit 840) for bleeder current includes terminals 842, 844, 846 and 848. In certain examples, the terminal 814 of the control unit 810 for LED output current is connected to the terminal 844 of the control unit 840) for bleeder current. For example, the terminal 844 of the control unit 840 for bleeder current receives a sensing signal 850 from the terminal 814 of the control unit 810 for LED output current. As an example, the sensing signal 850 represents the current 831 (e.g., $I_{led}$), and the control unit 840) for bleeder current generates the bleeder current 841 (e.g., $I_{bleed}$) based at least in part on the sensing signal 850. In some examples, the terminal 816 of the control unit 810 for LED output current and the terminal 846 of the control unit 840 for bleeder current are biased to a ground voltage. For example, the sensing voltage 850 is directly proportional to the current 831 (e.g., $I_{led}$) in magnitude, as follows:

$$V_{sense} = R_1 \times I_{led} \qquad \text{(Equation 9)}$$

where $V_{sense}$ represents the sensing voltage 850, $R_1$ represents the resistance of the resistor 876, and $I_{led}$ represents the current 831 flowing through the one or more LEDs 830.

In certain embodiments, the terminal 812 of the control unit 810 for LED output current is connected to a cathode of the one or more LEDs 830. In some embodiments, the terminals 842 and 848 of the control unit 840 for bleeder current are connected to an anode of the one or more LEDs 830. For example, the terminals 842 and 848 of the control unit 840 for bleeder current and the anode of the one or more LEDs 830 all receive a rectified voltage 823 (e.g., $V_{in}$) from the rectifier 820 (e.g., BD1). As an example, the rectified voltage 823 (e.g., $V_{in}$) is not clipped by any TRIAC dimmer. In certain examples, the rectifier 820 (e.g., BD1) also provides a current 825 (e.g., $I_{in}$). As an example, the current 825 (e.g., $I_{in}$) is determined as follows:

$$I_{in} \approx I_{led} + I_{bleed} \qquad \text{(Equation 10)}$$

where $I_{in}$ represents the current 825, $I_{led}$ represents the current 831, and $I_{bleed}$ represents the bleeder current 841. As an example, a current that flows through the resistor 862 is much smaller than the sum of the current 831 and the bleeder current 841. For example, as shown in Equation 10, the current 825 (e.g., $I_{in}$) is within 1% of the sum of the current 831 (e.g., $I_{led}$) and the bleeder current 841 (e.g., $I_{bleed}$). As an example, with the current 831 (e.g., $I_{led}$) being equal to zero in magnitude, the rectified voltage 823 (e.g., $V_{in}$) that is larger than zero in magnitude and the current 825 (e.g., $I_{in}$) that is also larger than zero in magnitude contribute to the active power of the LED lighting system 800 to increase the power factor of the LED lighting system 800 without any TRIAC dimmer.

According to some embodiments, the operational amplifier 872 (e.g., U1) includes a non-inverting input terminal (e.g., the "+" input terminal), an inverting input terminal (e.g., the "−" input terminal), and an output terminal. In certain examples, the non-inverting input terminal (e.g., the "+" input terminal) of the operational amplifier 872 (e.g., U1) receives a reference voltage 871 (e.g., $V_{ref1}$), and the inverting input terminal (e.g., the "−" input terminal) of the operational amplifier 872 (e.g., U1) receives the sensing signal 850 (e.g., a sensing voltage) from a source terminal of the transistor 874 (e.g., M1) and a terminal of the resistor 876 (e.g., R1), which are connected to each other. For example, another terminal of the resistor 876 (e.g., R1) is biased to the ground voltage through the terminal 816. In some examples, the transistor 874 (e.g., M1) also includes a drain terminal and a gate terminal. For example, the gate terminal of the transistor 874 (e.g., M1) is connected to the output terminal of the operational amplifier 872 (e.g., U1), and the drain terminal of the transistor 874 (e.g., M1) is connected to the cathode of the one or more LEDs 830 through the terminal 812.

According to certain embodiments, the control unit 840 includes a bleeder control subunit 892 and a bleeder generation subunit 894. For example, the bleeder control subunit 892 is used to control the magnitude of the bleeder current 841. As an example, the bleeder generation subunit 894 is used to generate the bleeder current 841. In some examples, the bleeder control subunit 892 includes the operational amplifier 854 (e.g., U4), the transistor 858 (e.g., M3), the transistor 834 (e.g., M4), the transistor 836 (e.g., M5), the resistor 862 (e.g., R3), the resistor 864 (e.g., R4), the resistor 866 (e.g., R5), and the resistor 868 (e.g., R6). For example, the resistor 862 (e.g., R3) and the resistor 864 (e.g., R4) are parts of a voltage divider for voltage detection. As an example, the transistor 834 (e.g., M4) and the transistor 836 (e.g., M5) are parts of a current mirror. In certain examples, the bleeder generation subunit 894 includes the operational amplifier 852 (e.g., U3), the switch 856 (e.g., K1), the comparator 882 (e.g., W2), the transistor 884 (e.g., M2), and the resistor 886 (e.g., R2).

In some embodiments, the resistor 862 (e.g., R3) of the voltage divider includes two terminals. For example, one terminal of the resistor 862 (e.g., R3) receives the rectified voltage 823 (e.g., $V_{in}$), and another terminal of the resistor 862 (e.g., R3) is connected to one terminal of the resistor 864 (e.g., R4) of the voltage divider to generate a detected voltage 863 (e.g., $V_s$). As an example, another terminal of the resistor 864 (e.g., R4) is biased to the ground voltage through the terminal 846 of the control unit 840.

In certain embodiments, the operational amplifier 854 (e.g., U4) includes a non-inverting input terminal (e.g., the "+" input terminal), an inverting input terminal (e.g., the "−" input terminal), and an output terminal. In some examples, the non-inverting input terminal (e.g., the "+" input terminal) of the operational amplifier 854 (e.g., U4) receives the detected voltage 863 (e.g., $V_s$) that is directly proportional to the rectified voltage 823 (e.g., $V_{in}$) as follows:

$$V_s = V_{in} \times \frac{R_4}{R_3 + R_4} \qquad \text{(Equation 11)}$$

where $V_s$ represents the detected voltage 863, and $V_{in}$ represents the rectified voltage 823. Additionally, $R_3$ represents the resistance of the resistor 862, and R4 represents the resistance of the resistor 864.

In certain examples, the inverting input terminal (e.g., the "−" input terminal) of the operational amplifier 854 (e.g., U4) is connected to both a source terminal of the transistor 858 (e.g., M3) and one terminal of the resistor 866 (e.g., R5). For example, another terminal of the resistor 866 (e.g., R5) is biased to the ground voltage through the terminal 846 of the control unit 840. As an example, the transistor 858 (e.g., M3) also includes a gate terminal and a drain terminal.

In some embodiments, the output terminal of the operational amplifier 854 (e.g., U4) is connected to the gate terminal of the transistor 858 (e.g., M3) to turn on or off the transistor 858 (e.g., M3). As an example, the drain terminal of the transistor 858 (e.g., M3) is connected to a drain terminal of the transistor 834 (e.g., M4). In some examples, a drain terminal of the transistor 836 (e.g., M5) is connected to one terminal of the resistor 868 (e.g., R6) to generate a voltage 837 (e.g., $V_{bleed}$). For example, another terminal of the resistor 868 (e.g., R6) is biased to the ground voltage through the terminal 846 of the control unit 840. In certain examples, a source terminal of the transistor 834 (e.g., M4) and a source terminal of the transistor 836 (e.g., M5) are both configured to receive a supply voltage (e.g., VDD).

According to certain embodiments, the operational amplifier 852 (e.g., U3) includes a non-inverting input terminal (e.g., the "+" input terminal), an inverting input terminal (e.g., the "−" input terminal), and an output terminal. For example, the non-inverting input terminal (e.g., the "+" input terminal) of the operational amplifier 852 (e.g., U3) receives the voltage 837 (e.g., $V_{bleed}$). As an example, the inverting input terminal (e.g., the "−" input terminal) of the operational amplifier 852 (e.g., U3) is connected to both a source terminal of the transistor 884 (e.g., M2) and one terminal of the resistor 886 (e.g., R2), and another terminal of the resistor 886 (e.g., R2) is biased to the ground voltage through the terminal 846 of the control unit 840).

According to some embodiments, the transistor 884 (e.g., M2) also includes a gate terminal and a drain terminal. In certain examples, the gate terminal of the transistor 884 (e.g., M2) is connected to both the output terminal of the operational amplifier 852 (e.g., U3) and one terminal of the switch 856 (e.g., K1). For example, another terminal of the switch 856 (e.g., K1) is biased to the ground voltage through the terminal 846 of the control unit 840. In certain examples, the drain terminal of the transistor 884 (e.g., M2) receives the rectified voltage 823 (e.g., $V_{in}$) through the terminal 842.

In some embodiments, the comparator 882 (e.g., W2) includes a non-inverting input terminal (e.g., the "+" input terminal), an inverting input terminal (e.g., the "−" input terminal), and an output terminal. In certain examples, the non-inverting input terminal (e.g., the "+" input terminal) of the comparator 882 (e.g., W2) receives a reference voltage 881 (e.g., $V_{ref2}$). For example, the reference voltage 881 (e.g., $V_{ref2}$) is smaller than the reference voltage 871 (e.g., $V_{ref1}$). In some examples, the inverting input terminal (e.g., the "−" input terminal) of the comparator 882 (e.g., W2) receives the sensing signal 850 (e.g., a sensing voltage) from the source terminal of the transistor 874 (e.g., M1) and a terminal of the resistor 876 (e.g., $R_1$), which are connected to each other. For example, the inverting input terminal (e.g., the "−" input terminal) of the comparator 882 (e.g., W2) receives the sensing signal 850 (e.g., a sensing voltage) through the terminals 814 and 844.

In certain embodiments, the output terminal of the comparator 882 (e.g., W2) generates a control signal 883 (e.g., Ctrl), which is received by the switch 856 (e.g., K1). For example, if the control signal 883 (e.g., Ctrl) is at a logic low level, the switch 856 (e.g., K1) is closed. As an example, if the control signal 883 (e.g., Ctrl) is at a logic high level, the switch 856 (e.g., K1) is open. In some examples, one terminal of the switch 856 (e.g., K1) is connected to the gate terminal of the transistor 884 (e.g., M2) and the output terminal of the operational amplifier 852 (e.g., U3).

According to some embodiments, if the switch 856 (e.g., K1) is closed, the gate terminal of the transistor 884 (e.g., M2) is biased to the ground voltage through the terminal 846 of the control unit 840 and the transistor 884 (e.g., M2) is turned off. For example, if the transistor 884 (e.g., M2) is turned off, the magnitude of the bleeder current 841 (e.g., $I_{bleed}$) is equal to zero.

According to certain embodiments, if the switch 856 (e.g., K1) is open, the gate terminal of the transistor 884 (e.g., M2) is not biased to the ground voltage through the terminal 846 of the control unit 840, but instead the gate terminal of the transistor 884 (e.g., M2) is controlled by a drive signal 853 received from the output terminal of the operational amplifier 852 (e.g., U3). For example, when the transistor 884 (e.g., M2) is turned on by the drive signal 853 received from the output terminal of the operational amplifier 852 (e.g., U3), the magnitude of the bleeder current 841 (e.g., $I_{bleed}$) is determined as follows:

$$I_{bleed} = \frac{V_{bleed}}{R_2} \quad \text{(Equation 12)}$$

where $I_{bleed}$ represents the bleeder current 841. Additionally, $V_{bleed}$ represents the voltage 837, and R2 represents the resistance of the resistor 886. As an example, the voltage 837 (e.g., $V_{bleed}$) is directly proportional to the rectified voltage 823 (e.g., $V_{in}$) with a proportionality constant that depends at least in part on the resistance of the resistor 862 (e.g., R3), the resistance of the resistor 864 (e.g., R4), the resistance of the resistor 866 (e.g., R5), the resistance of the resistor 868 (e.g., R6), and a ratio (e.g., k) of the current 869 to the current 867. As an example, when the transistor 884 (e.g., M2) is turned on, the bleeder current 841 (e.g., $I_{bleed}$) is directly proportional to the rectified voltage 823 (e.g., $V_{in}$).

In some embodiments, the inverting input terminal (e.g., the "−" input terminal) of the operational amplifier 854 (e.g., U4), the source terminal of the transistor 858 (e.g., M3), and the resistor 866 (e.g., R5) are parts of a negative feedback loop. As an example, during the normal operation of the LED lighting system 800, the voltage at the source terminal of the transistor 858 (e.g., M3) is equal to the detected voltage 863 (e.g., $V_s$) as follows:

$$V_3 = V_s \quad \text{(Equation 13)}$$

where $V_3$ represents the voltage at the source terminal of the transistor 858 (e.g., M3), and $V_s$ represents the detected voltage 863.

In certain embodiments, the voltage at the source terminal of the transistor 858 (e.g., M3) corresponds to a current 867 that flows through the resistor 866 (e.g., R5). For example, the current 867 is used by the current mirror that includes the transistor 834 (e.g., M4) and the transistor 836 (e.g., M5) to generate a current 869 as follows:

$$I_{869} = k \times I_{867} \quad \text{(Equation 14)}$$

where $I_{869}$ represents the current 869, and $I_{867}$ represents the current 867. Additionally, k represents a predetermined constant ratio that is a positive integer. As an example, the current 869 flows through the resistor 868 (e.g., R6) and generates the voltage 837 (e.g., $V_{bleed}$).

According to certain embodiments, the inverting input terminal (e.g., the "−" input terminal) of the operational amplifier 852 (e.g., U3), the source terminal of the transistor 884 (e.g., M2), and the resistor 886 (e.g., R2) are parts of a negative feedback loop. For example, during the normal operation of the LED lighting system 800, the voltage at the source terminal of the transistor 884 (e.g., M2) is equal to the voltage 837 (e.g., $V_{bleed}$).

In some embodiments, after the LED lighting system 800 is powered on, an AC input voltage 821 (e.g., $V_{AC}$) is received directly by the rectifier 820 (e.g., BD1) without through any TRIAC dimmer according to some embodiments. For example, the rectifier 820 (e.g., BD1) rectifies the AC input voltage 821 (e.g., $V_{AC}$) and generates the rectified voltage 823 (e.g., $V_{in}$). As an example, the rectified voltage 823 (e.g., $V_{in}$) is used to control the current 831 (e.g., $I_{led}$) that flows through the one or more LEDs 830.

In certain embodiments, if the switch 856 (e.g., K1) is open, the output terminal of the operational amplifier 852 (e.g., U3) sends the drive signal 853 to the gate terminal of the transistor 884 (e.g., M2). In some examples, when the switch 856 (e.g., K1) is open, the drive signal 853 is used to turn on or turn off the transistor 884 (e.g., M2) in order to control the bleeder current 841 (e.g., $I_{bleed}$). For example, if the transistor 884 (e.g., M2) is turned on, the magnitude of the bleeder current 841 (e.g., $I_{bleed}$) is larger than zero. As an example, if the transistor 884 (e.g., M2) is turned off, the magnitude of the bleeder current 841 (e.g., $I_{bleed}$) is equal to zero.

As mentioned above and further emphasized here. FIG. 8 is merely an example, which should not unduly limit the scope of the claims. One of ordinary skill in the art would recognize many variations, alternatives, and modifications. For example, the transistor 874 is a bipolar junction transistor. As an example, the resistance of the resistor 886 (e.g., R2) is adjusted in order to control the magnitude of the bleeder current 841 (e.g., $I_{bleed}$) with the same rectified voltage 823 (e.g., $V_{in}$) and to achieve the desired power factor for the LED lighting system 800. For example, with different peak amplitudes for the AC input voltage 821 (e.g., $V_{AC}$), the resistance of the resistor 866 (e.g., R5) is adjusted in order to achieve the desired corresponding power factor and also achieve a proper balance between the power factor and the power efficiency for the LED lighting system 800.

Figure 9:
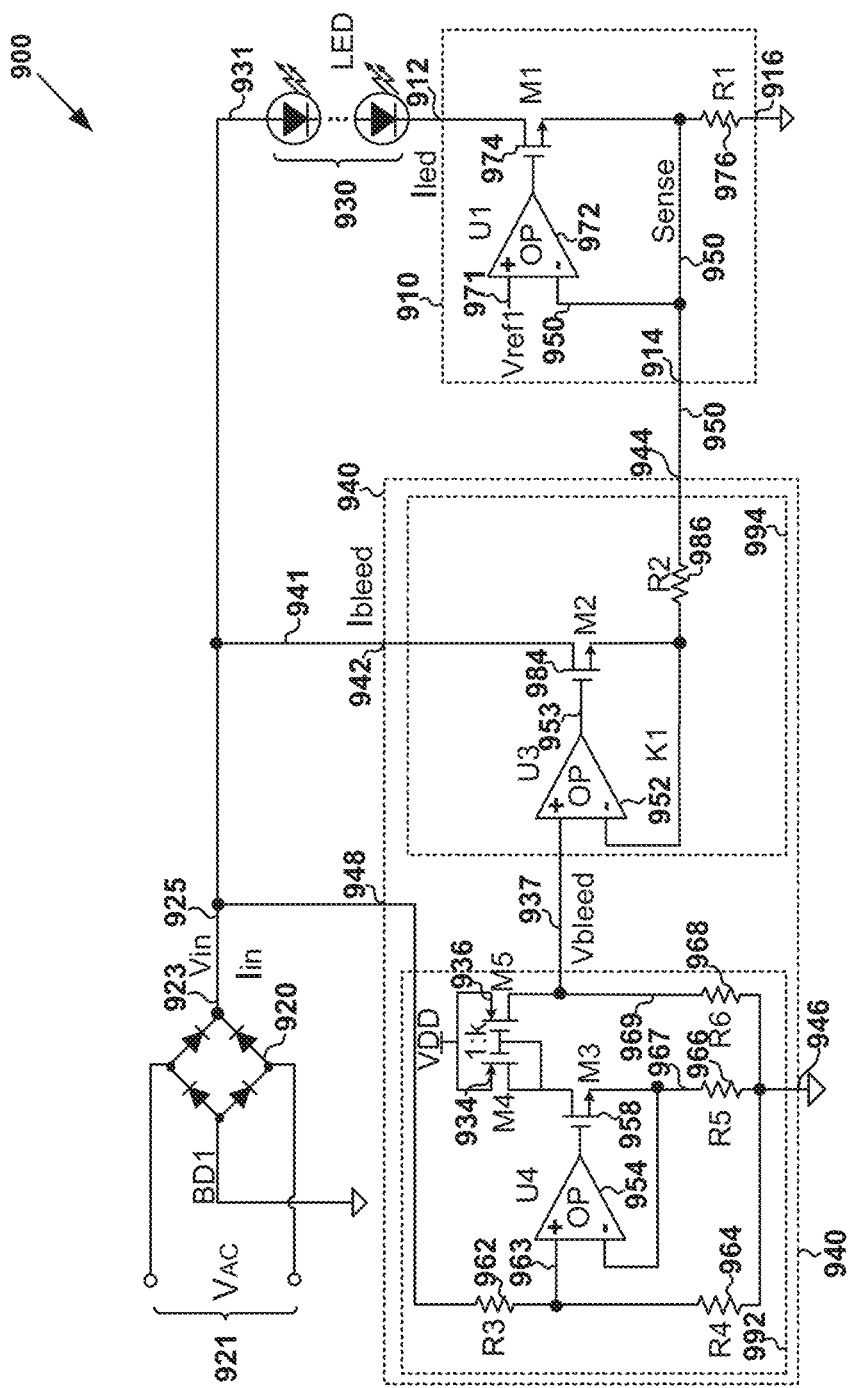
FIG. 9 is a simplified diagram showing an LED lighting system without any TRIAC dimmer according to some embodiments of the present invention.

FIG. 9 is a simplified diagram showing an LED lighting system without any TRIAC dimmer according to some embodiments of the present invention. This diagram is merely an example, which should not unduly limit the scope of the claims. One of ordinary skill in the art would recognize many variations, alternatives, and modifications. The LED lighting system 900 includes a rectifier 920 (e.g., BD1), one or more LEDs 930, a control unit 910 for LED output current, and a control unit 940 for bleeder current, but the LED lighting system 900 does not include any TRIAC dimmer. As shown in FIG. 9, the control unit 910 for LED output current and the control unit 940 for bleeder current are parts of a controller according to certain embodiments.

In certain examples, the control unit 910 for LED output current includes an operational amplifier 972 (e.g., U1), a transistor 974 (e.g., M1), and a resistor 976 (e.g., R1). In some examples, the control unit 940 for bleeder current includes an operational amplifier 952 (e.g., U3), an operational amplifier 954 (e.g., U4), a transistor 984 (e.g., M2), a transistor 958 (e.g., M3), a transistor 934 (e.g., M4), a transistor 936 (e.g., M5), a resistor 986 (e.g., R2), a resistor 962 (e.g., R3), a resistor 964 (e.g., R4), a resistor 966 (e.g., R5), and a resistor 968 (e.g., R6). For example, the rectifier 920 (e.g., BD1) is a full wave rectifier. As an example, the transistor 974 (e.g., M1) is a field-effect transistor. Although the above has been shown using a selected group of components for the LED lighting system 900, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the LED lighting system 900 is the same as the LED lighting system 300. For example, the rectifier 920 is the same as the rectifier 320, the one or more LEDs 930 are the same as the one or more LEDs 330, the control unit 910 for LED output current is the same as the control unit 310 for LED output current, and the control unit 940 for bleeder current is the same as the control unit 340 for bleeder current.

As shown in FIG. 9, a current 931 (e.g., $I_{led}$) flows through the one or more LEDs 930, and the control unit 910 for LED output current is used to keep the current 931 (e.g., $I_{led}$) equal to a constant magnitude that is larger than zero during a duration of time according to some embodiments. As an example, during another duration of time, the magnitude of the current 931 (e.g., $I_{led}$) is equal to zero, and the control unit 940 for bleeder current is used to generate a bleeder current 941 (e.g., $I_{bleed}$) that is larger than zero in magnitude.

In some embodiments, the control unit 910 for LED output current includes terminals 912, 914 and 916, and the control unit 940 for bleeder current includes terminals 942, 944, 946 and 948. In certain examples, the terminal 914 of the control unit 910 for LED output current is connected to the terminal 944 of the control unit 940 for bleeder current. For example, the terminal 944 of the control unit 940 for bleeder current receives a sensing signal 950 from the terminal 914 of the control unit 910 for LED output current. As an example, the sensing signal 950 represents the current 931 (e.g., $I_{led}$), and the control unit 940) for bleeder current generates the bleeder current 941 (e.g., $I_{bleed}$) based at least in part on the sensing signal 950. In some examples, the terminal 916 of the control unit 910 for LED output current and the terminal 946 of the control unit 940 for bleeder current are biased to a ground voltage. For example, the sensing voltage 950 is directly proportional to the current 931 (e.g., $I_{led}$) in magnitude, as follows:

$$V_{sense} = R_1 \times I_{led} \quad \text{(Equation 15)}$$

where $V_{sense}$ represents the sensing voltage 950, $R_1$ represents the resistance of the resistor 976, and $I_{led}$ represents the current 931 flowing through the one or more LEDs 930.

In certain embodiments, the terminal 912 of the control unit 910 for LED output current is connected to a cathode of the one or more LEDs 930. In some embodiments, the terminals 942 and 948 of the control unit 940) for bleeder current are connected to an anode of the one or more LEDs 930. For example, the terminals 942 and 948 of the control unit 940 for bleeder current and the anode of the one or more LEDs 930 all receive a rectified voltage 923 (e.g., $V_{in}$) from the rectifier 920 (e.g., BD1). As an example, the rectified voltage 923 (e.g., $V_{in}$) is not clipped by any TRIAC dimmer. In certain examples, the rectifier 920 (e.g., BD1) also provides a current 925 (e.g., $I_{in}$). As an example, the current 925 (e.g., $I_{in}$) is determined as follows:

$$I_{in} \approx I_{led} + I_{bleed} \quad \text{(Equation 16)}$$

where $I_{in}$ represents the current 925, $I_{led}$ represents the current 931, and $I_{bleed}$ represents the bleeder current 941. As an example, a current that flows through the resistor 962 is much smaller than the sum of the current 931 and the bleeder current 941. For example, as shown in Equation 16, the current 925 (e.g., $I_{in}$) is within 1% of the sum of the current 931 (e.g., $I_{led}$) and the bleeder current 941 (e.g., $I_{bleed}$). As an example, with the current 931 (e.g., $I_{led}$) being equal to zero in magnitude, the rectified voltage 923 (e.g., $V_{in}$) that is larger than zero in magnitude and the current 925 (e.g., $I_{in}$) that is also larger than zero in magnitude contribute to the active power of the LED lighting system 900 to increase the power factor of the LED lighting system 900 without any TRIAC dimmer.

According to some embodiments, the operational amplifier 972 (e.g., U1) includes a non-inverting input terminal (e.g., the "+" input terminal), an inverting input terminal (e.g., the "−" input terminal), and an output terminal. In certain examples, the non-inverting input terminal (e.g., the "+" input terminal) of the operational amplifier 972 (e.g., U1) receives a reference voltage 971 (e.g., $V_{ref1}$), and the inverting input terminal (e.g., the "−" input terminal) of the operational amplifier 972 (e.g., U1) receives the sensing signal 950 (e.g., a sensing voltage) from a source terminal of the transistor 974 (e.g., M1) and a terminal of the resistor 976 (e.g., R1), which are connected to each other. For example, another terminal of the resistor 976 (e.g., R1) is biased to the ground voltage through the terminal 916. In some examples, the transistor 974 (e.g., M1) also includes a drain terminal and a gate terminal. For example, the gate terminal of the transistor 974 (e.g., M1) is connected to the output terminal of the operational amplifier 972 (e.g., U1), and the drain terminal of the transistor 974 (e.g., M1) is connected to the cathode of the one or more LEDs 930 through the terminal 912.

According to certain embodiments, the control unit 940) includes a bleeder control subunit 992 and a bleeder generation subunit 994. For example, the bleeder control subunit 992 is used to control the magnitude of the bleeder current 941. As an example, the bleeder generation subunit 994 is used to generate the bleeder current 941. In some examples, the bleeder control subunit 992 includes the operational amplifier 954 (e.g., U4), the transistor 958 (e.g., M3), the transistor 934 (e.g., M4), the transistor 936 (e.g., M5), the resistor 962 (e.g., R3), the resistor 964 (e.g., R4), the resistor 966 (e.g., R5), and the resistor 968 (e.g., R6). For example, the resistor 962 (e.g., R3) and the resistor 964 (e.g., R4) are parts of a voltage divider for voltage detection. As an example, the transistor 934 (e.g., M4) and the transistor 936 (e.g., M5) are parts of a current mirror. In certain examples, the bleeder generation subunit 994 includes the operational amplifier 952 (e.g., U3), the transistor 984 (e.g., M2), and the resistor 986 (e.g., R2).

In some embodiments, the resistor 962 (e.g., R3) of the voltage divider includes two terminals. For example, one terminal of the resistor 962 (e.g., R3) receives the rectified voltage 923 (e.g., $V_{in}$), and another terminal of the resistor 962 (e.g., R3) is connected to one terminal of the resistor 964 (e.g., R4) of the voltage divider to generate a detected voltage 963 (e.g., $V_s$). As an example, another terminal of the resistor 964 (e.g., R4) is biased to the ground voltage through the terminal 946 of the control unit 940.

In certain embodiments, the operational amplifier 954 (e.g., U4) includes a non-inverting input terminal (e.g., the "+" input terminal), an inverting input terminal (e.g., the "−" input terminal), and an output terminal. In some examples, the non-inverting input terminal (e.g., the "+" input terminal) of the operational amplifier 954 (e.g., U4) receives the detected voltage 963 (e.g., V$_s$) that is directly proportional to the rectified voltage 923 (e.g., V$_{in}$) as follows:

$$V_s = V_{in} \times \frac{R_4}{R_3 + R_4} \quad \text{(Equation 17)}$$

where V$_s$ represents the detected voltage 963, and V$_{in}$ represents the rectified voltage 923. Additionally, R$_3$ represents the resistance of the resistor 962, and R4 represents the resistance of the resistor 964. In certain examples, the inverting input terminal (e.g., the "−" input terminal) of the operational amplifier 954 (e.g., U4) is connected to both a source terminal of the transistor 958 (e.g., M3) and one terminal of the resistor 966 (e.g., R5). For example, another terminal of the resistor 966 (e.g., R5) is biased to the ground voltage through the terminal 946 of the control unit 940. As an example, the transistor 958 (e.g., M3) also includes a gate terminal and a drain terminal.

According to some embodiments, the output terminal of the operational amplifier 954 (e.g., U4) is connected to the gate terminal of the transistor 958 (e.g., M3) to turn on or off the transistor 958 (e.g., M3). As an example, the drain terminal of the transistor 958 (e.g., M3) is connected to a drain terminal of the transistor 934 (e.g., M4). In some examples, a drain terminal of the transistor 936 (e.g., M5) is connected to one terminal of the resistor 968 (e.g., R6) to generate a voltage 937 (e.g., V$_{bleed}$). For example, another terminal of the resistor 968 (e.g., R6) is biased to the ground voltage through the terminal 946 of the control unit 940. In certain examples, a source terminal of the transistor 934 (e.g., M4) and a source terminal of the transistor 936 (e.g., M5) are both configured to receive a supply voltage (e.g., VDD).

According to certain embodiments, the operational amplifier 952 (e.g., U3) includes a non-inverting input terminal (e.g., the "+" input terminal), an inverting input terminal (e.g., the "−" input terminal), and an output terminal. In some examples, the non-inverting input terminal (e.g., the "+" input terminal) of the operational amplifier 952 (e.g., U3) receives the voltage 937 (e.g., V$_{bleed}$), and the inverting input terminal (e.g., the "−" input terminal) of the operational amplifier 952 (e.g., U3) is connected to a source terminal of the transistor 984 (e.g., M2) and one terminal of the resistor 986 (e.g., R2). For example, another terminal of the resistor 986 (e.g., R2) receives the sensing signal 950 (e.g., a sensing voltage) through the terminal 944. In certain examples, the transistor 984 (e.g., M2) also includes a gate terminal and a drain terminal. For example, the gate terminal of the transistor 984 (e.g., M2) is connected to the output terminal of the operational amplifier 952 (e.g., U3). As an example, the drain terminal of the transistor 984 (e.g., M2) receives the rectified voltage 923 (e.g., V$_{in}$) through the terminal 942.

In some embodiments, after the LED lighting system 900 is powered on, an AC input voltage 921 (e.g., V$_{AC}$) is received directly by the rectifier 920 (e.g., BD1) without through any TRIAC dimmer according to some embodiments. For example, the rectifier 920 (e.g., BD1) rectifies the AC input voltage 921 (e.g., V$_{AC}$) and generates the rectified voltage 923 (e.g., V$_{in}$). As an example, the rectified voltage 923 (e.g., V$_{in}$) is used to control the current 931 (e.g., I$_{led}$) that flows through the one or more LEDs 930.

In certain embodiments, the output terminal of the operational amplifier 952 (e.g., U3) sends a drive signal 953 to the gate terminal of the transistor 984 (e.g., M2). In some examples, the drive signal 953 is used to turn on or turn off the transistor 984 (e.g., M2) in order to control the bleeder current 941 (e.g., I$_{bleed}$). For example, if the transistor 984 (e.g., M2) is turned on, the magnitude of the bleeder current 941 (e.g., I$_{bleed}$) is larger than zero. As an example, when the transistor 984 (e.g., M2) is turned on, the bleeder current 941 (e.g., I$_{bleed}$) is directly proportional to the rectified voltage 923 (e.g., V$_{in}$). For example, if the transistor 984 (e.g., M2) is turned off, the magnitude of the bleeder current 941 (e.g., I$_{bleed}$) is equal to zero.

According to some embodiments, the inverting input terminal (e.g., the "−" input terminal) of the operational amplifier 954 (e.g., U4), the source terminal of the transistor 958 (e.g., M3), and the resistor 966 (e.g., R5) are parts of a negative feedback loop. As an example, during the normal operation of the LED lighting system 900, the voltage at the source terminal of the transistor 958 (e.g., M3) is equal to the detected voltage 963 (e.g., V$_s$) as follows:

$$V_3 = V_s \quad \text{(Equation 18)}$$

where V$_3$ represents the voltage at the source terminal of the transistor 958 (e.g., M3), and V$_s$ represents the detected voltage 963.

In certain embodiments, the voltage at the source terminal of the transistor 958 (e.g., M3) corresponds to a current 967 that flows through the resistor 966 (e.g., R5). For example, the current 967 is used by the current mirror that includes the transistor 934 (e.g., M4) and the transistor 936 (e.g., M5) to generate a current 969 as follows:

$$I_{969} = k \times I_{967} \quad \text{(Equation 19)}$$

where I$_{969}$ represents the current 969, and I$_{967}$ represents the current 967. Additionally, k represents a predetermined constant ratio that is a positive integer. As an example, the current 969 flows through the resistor 968 (e.g., R6) and generates the voltage 937 (e.g., V$_{bleed}$).

According to certain embodiments, the inverting input terminal (e.g., the "−" input terminal) of the operational amplifier 952 (e.g., U3), the source terminal of the transistor 984 (e.g., M2), the resistor 986 (e.g., R2), and the resistor 976 (e.g., R1) are parts of a negative feedback loop. For example, during the normal operation of the LED lighting system 900, the voltage at the source terminal of the transistor 984 (e.g., M2) is equal to the voltage 937 (e.g., V$_{bleed}$).

As mentioned above and further emphasized here, FIG. 9 is merely an example, which should not unduly limit the scope of the claims. One of ordinary skill in the art would recognize many variations, alternatives, and modifications. For example, the transistor 974 is a bipolar junction transistor. As an example, the resistance of the resistor 986 (e.g., R2) is adjusted in order to control the magnitude of the bleeder current 941 (e.g., I$_{bleed}$) with the same rectified voltage 923 (e.g., V$_{in}$) and to achieve the desired power factor for the LED lighting system 900. For example, with different peak amplitudes for the AC input voltage 921 (e.g., V$_{AC}$), the resistance of the resistor 966 (e.g., R5) is adjusted in order to achieve the desired corresponding power factor and also achieve a proper balance between the power factor and the power efficiency for.

As discussed above and further emphasized here, FIG. 3 and FIG. 4 are merely examples, which should not unduly limit the scope of the claims. One of ordinary skill in the art would recognize many variations, alternatives, and modifications. For example, if the LED lighting system 300 is implemented according to the LED lighting system 900, around time $t_2$, the current 325 (e.g., $I_{in}$) gradually rises from the magnitude 494 to the constant magnitude 492, and around time $t_3$, the current 325 (e.g., $I_{in}$) gradually drops from the constant magnitude 492 to the magnitude 496. As an example, the magnitude 494 and the magnitude 496 are equal.

Certain embodiments of the present invention use the bleeder current to increase the active power and also increase the power factor of the LED lighting system without any TRIAC dimmer. Some embodiments of the present invention control the bleeder current based at least in part on the current that flows through the one or more LEDs to improve the power efficiency of the LED lighting system without any TRIAC dimmer. For example, if the current that flows through the one or more LEDs is not equal to zero in magnitude, the bleeder current is equal to zero in magnitude so that the control unit for bleeder current does not consume additional power in order to avoid significantly lower the power efficiency of the LED lighting system without any TRIAC dimmer.

According to some embodiments, a system for controlling a bleeder current to increase a power factor of an LED lighting system without any TRIAC dimmer includes: a first current controller configured to receive a rectified voltage generated by a rectifier that directly receives an AC input voltage without through any TRIAC dimmer; and a second current controller configured to: control a light emitting diode current flowing through one or more light emitting diodes that receive the rectified voltage not clipped by any TRIAC dimmer; and generate a sensing voltage based at least in part upon the light emitting diode current, the sensing voltage representing the light emitting diode current in magnitude; wherein the first current controller is further configured to: receive the sensing voltage from the second current controller; and generate a bleeder current based at least in part on the sensing voltage; wherein the first current controller is further configured to: if the light emitting diode current is larger than zero in magnitude, generate the bleeder current equal to zero in magnitude; and if the light emitting diode current is equal to zero in magnitude, generate the bleeder current larger than zero in magnitude; wherein the first current controller is further configured to, if the light emitting diode current is equal to zero in magnitude: increase the bleeder current with the increasing rectified voltage in magnitude; and decrease the bleeder current with the decreasing rectified voltage in magnitude; wherein a rectifier current generated by the rectifier is equal to a sum of the bleeder current and the light emitting diode current in magnitude; wherein, with the light emitting diode current being equal to zero in magnitude, the rectified voltage and the rectifier current contribute to an active power to increase the power factor of the LED lighting system without any TRIAC dimmer. For example, the system is implemented according to at last FIG. 3. FIG. 4. FIG. 5. FIG. 6. FIG. 7. FIG. 8, and/or FIG. 9.

As an example, the sensing voltage is directly proportional to the light emitting diode current in magnitude. For example, if the light emitting diode current is equal to zero in magnitude, the bleeder current is directly proportional to the rectified voltage in magnitude. As an example, if the light emitting diode current is larger than zero in magnitude, the rectifier current is equal to a first magnitude; and if the light emitting diode current is equal to zero in magnitude, the rectifier current is equal to a second magnitude; wherein the first magnitude is larger than the second magnitude. For example, the first magnitude does not change with time; and the second magnitude changes with time.

As an example, each cycle of the AC input voltage includes two half cycles of the AC input voltage; and one half cycle the AC input voltage starts at a first time, passes a second time and a third time, and ends at a fourth time; wherein: the first time precedes the second time; the second time precedes the third time; and the third time precedes the fourth time. For example, the rectified voltage is equal to zero in magnitude at the first time and at the fourth time; and after the first time but before the fourth time, the rectified voltage is larger than zero in magnitude during an entire duration from the first time to the fourth time.

As an example, the rectified voltage becomes larger than a threshold voltage in magnitude at the second time; and the rectified voltage becomes smaller than the threshold voltage in magnitude at the third time. For example, after the first time but before the second time, the light emitting diode current is equal to zero in magnitude; and the bleeder current is larger than zero in magnitude; after the second time but before the third time, the light emitting diode current is larger than zero in magnitude; and the bleeder current is equal to zero in magnitude; and after the third time but before the fourth time, the light emitting diode current is equal to zero in magnitude; and the bleeder current is larger than zero in magnitude.

For example, from the first time to the second time, the rectifier current increases to a first magnitude; from the second time to the third time, the rectifier current remains at a second magnitude; and from the third time to the fourth time, the rectifier current decreases from the first magnitude. As an example, at the second time, the rectifier current rises from the first magnitude to the second magnitude; and at the third time, the rectifier current drops from the second magnitude to the first magnitude. For example, the second magnitude is larger than the first magnitude. As an example, after the first time but before the second time: the rectified voltage remains larger than zero in magnitude; the rectifier current remains larger than zero in magnitude; and the rectified voltage and the rectifier current contribute to the active power to increase the power factor of the LED lighting system without any TRIAC dimmer. For example, wherein, after the third time but before the fourth time: the rectified voltage remains larger than zero in magnitude; the rectifier current remains larger than zero in magnitude; and the rectified voltage and the rectifier current contribute to the active power to increase the power factor of the LED lighting system without any TRIAC dimmer.

According to certain embodiments, a system for controlling a bleeder current to increase a power factor of an LED lighting system without any TRIAC dimmer includes: a first current controller configured to receive a rectified voltage generated by a rectifier that directly receives an AC input voltage without through any TRIAC dimmer; and a second current controller configured to: control a light emitting diode current flowing through one or more light emitting diodes that receive the rectified voltage not clipped by any TRIAC dimmer; and generate a sensing voltage based at least in part upon the light emitting diode current, the sensing voltage representing the light emitting diode current in magnitude; wherein the first current controller is further configured to: receive the sensing voltage from the second current controller; and generate a bleeder current based at least in part on the sensing voltage; wherein the first current controller is further configured to: if the light emitting diode current is larger than zero in magnitude, generate the bleeder current equal to zero in magnitude; and if the light emitting diode current is equal to zero in magnitude, generate the bleeder current larger than zero in magnitude; wherein the first current controller is further configured to, if the light emitting diode current is equal to zero in magnitude: increase the bleeder current with the increasing rectified voltage in magnitude; and decrease the bleeder current with the decreasing rectified voltage in magnitude; wherein a rectifier current generated by the rectifier is approximately equal to a sum of the bleeder current and the light emitting diode current in magnitude; wherein, with the light emitting diode current being equal to zero in magnitude, the rectified voltage and the rectifier current contribute to an active power to increase the power factor of the LED lighting system without any TRIAC dimmer. For example, the system is implemented according to at last FIG. 3. FIG. 4. FIG. 5. FIG. 6. FIG. 7. FIG. 8, and/or FIG. 9.

According to some embodiments, a method for controlling a bleeder current to increase a power factor of an LED lighting system without any TRIAC dimmer includes: receiving a rectified voltage generated by a rectifier that directly receives an AC input voltage without through any TRIAC dimmer; controlling a light emitting diode current flowing through one or more light emitting diodes that receive the rectified voltage not clipped by any TRIAC dimmer; generating a sensing voltage based at least in part upon the light emitting diode current, the sensing voltage representing the light emitting diode current in magnitude; receiving the sensing voltage; and generating a bleeder current based at least in part on the sensing voltage; wherein the generating a bleeder current based at least in part on the sensing voltage includes: if the light emitting diode current is larger than zero in magnitude, generating the bleeder current equal to zero in magnitude; and if the light emitting diode current is equal to zero in magnitude, generating the bleeder current larger than zero in magnitude; wherein the generating the bleeder current larger than zero in magnitude if the light emitting diode current is equal to zero in magnitude includes: increasing the bleeder current with the increasing rectified voltage in magnitude; and decreasing the bleeder current with the decreasing rectified voltage in magnitude; wherein a rectifier current generated by the rectifier is equal to a sum of the bleeder current and the light emitting diode current in magnitude; wherein, with the light emitting diode current being equal to zero in magnitude, the rectified voltage and the rectifier current contribute to an active power to increase the power factor of the LED lighting system without any TRIAC dimmer. For example, the method is implemented according to at last FIG. 3, FIG. 4, FIG. 5, FIG. 6, FIG. 7, FIG. 8, and/or FIG. 9.

As an example, the sensing voltage is directly proportional to the light emitting diode current in magnitude. For example, if the light emitting diode current is equal to zero in magnitude, the bleeder current is directly proportional to the rectified voltage in magnitude. As an example, each cycle of the AC input voltage includes two half cycles of the AC input voltage; and one half cycle the AC input voltage starts at a first time, passes a second time and a third time, and ends at a fourth time; wherein: the first time precedes the second time; the second time precedes the third time; and the third time precedes the fourth time. For example, after the first time but before the second time: the rectified voltage remains larger than zero in magnitude; the rectifier current remains larger than zero in magnitude; and the rectified voltage and the rectifier current contribute to the active power to increase the power factor of the LED lighting system without any TRIAC dimmer. As an example, after the third time but before the fourth time: the rectified voltage remains larger than zero in magnitude; the rectifier current remains larger than zero in magnitude; and the rectified voltage and the rectifier current contribute to the active power to increase the power factor of the LED lighting system without any TRIAC dimmer.

According to certain embodiments, a method for controlling a bleeder current to increase a power factor of an LED lighting system without any TRIAC dimmer includes: receiving a rectified voltage generated by a rectifier that directly receives an AC input voltage without through any TRIAC dimmer; controlling a light emitting diode current flowing through one or more light emitting diodes that receive the rectified voltage not clipped by any TRIAC dimmer; generating a sensing voltage based at least in part upon the light emitting diode current, the sensing voltage representing the light emitting diode current in magnitude; receiving the sensing voltage; and generating a bleeder current based at least in part on the sensing voltage; wherein the generating a bleeder current based at least in part on the sensing voltage includes: if the light emitting diode current is larger than zero in magnitude, generating the bleeder current equal to zero in magnitude; and if the light emitting diode current is equal to zero in magnitude, generating the bleeder current larger than zero in magnitude; wherein the generating the bleeder current larger than zero in magnitude if the light emitting diode current is equal to zero in magnitude includes: increasing the bleeder current with the increasing rectified voltage in magnitude; and decreasing the bleeder current with the decreasing rectified voltage in magnitude; wherein a rectifier current generated by the rectifier is approximately equal to a sum of the bleeder current and the light emitting diode current in magnitude; wherein, with the light emitting diode current being equal to zero in magnitude, the rectified voltage and the rectifier current contribute to an active power to increase the power factor of the LED lighting system without any TRIAC dimmer. For example, the method is implemented according to at last FIG. 3, FIG. 4, FIG. 5, FIG. 6, FIG. 7. FIG. 8, and/or FIG. 9.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A controller system for controlling a bleeder current of an LED lighting system, the controller system comprising:
 a current controller configured to receive a rectified voltage generated by a rectifier that receives an AC input voltage;

wherein the current controller is further configured to:
  receive a sensing voltage representing a light emitting diode current flowing through one or more light emitting diodes; and
  generate a bleeder current based at least in part on the sensing voltage;
wherein the current controller is further configured to:
  in response to the light emitting diode current being larger than zero in magnitude, generate the bleeder current equal to zero in magnitude; and
  in response to the light emitting diode current being equal to zero in magnitude,
    generate the bleeder current larger than zero in magnitude; and
    change the bleeder current with the changing rectified voltage in magnitude;
wherein the current controller is further configured to, with the light emitting diode current being equal to zero in magnitude:
  increase the bleeder current with the increasing rectified voltage in magnitude; and
  decrease the bleeder current with the decreasing rectified voltage in magnitude.

2. The controller system of claim 1 wherein a sum of the bleeder current and the light emitting diode current is equal to, in magnitude, a rectifier current generated by the rectifier.

3. The controller system of claim 2 wherein, with the light emitting diode current being equal to zero in magnitude, the rectified voltage and the rectifier current contribute to an active power to increase a power factor of the LED lighting system.

4. The controller system of claim 1 wherein the sensing voltage is directly proportional to the light emitting diode current in magnitude.

5. The controller system of claim 1 wherein:
in response to the light emitting diode current increasing from being equal to zero to being larger than zero, a rectifier current increases from a first magnitude to a second magnitude; and
in response to the light emitting diode current decreasing from being larger than zero to being equal to zero, the rectifier current decreases from the second magnitude to a third magnitude;
wherein:
  the first magnitude is larger than zero;
  the second magnitude is larger than zero; and
  the third magnitude is larger than zero.

6. The controller system of claim 5 wherein the first magnitude and the third magnitude are equal.

7. The controller system of claim 1 wherein:
each cycle of the AC input voltage includes two half cycles of the AC input voltage; and
one half cycle of the AC input voltage starts at a first time, passes a second time and a third time, and ends at a fourth time;
wherein:
  the first time precedes the second time;
  the second time precedes the third time; and
  the third time precedes the fourth time.

8. The controller system of claim 7 wherein:
the rectified voltage is equal to zero in magnitude at the first time and at the fourth time; and
after the first time but before the fourth time, the rectified voltage is larger than zero in magnitude during an entire duration from the first time to the fourth time.

9. The controller system of claim 8 wherein:
the rectified voltage becomes larger than a threshold voltage in magnitude at the second time; and
the rectified voltage becomes smaller than the threshold voltage in magnitude at the third time.

10. The controller system of claim 9 wherein:
after the first time but before the second time,
  the light emitting diode current is equal to zero in magnitude; and
  the bleeder current is larger than zero in magnitude;
after the second time but before the third time,
  the light emitting diode current is larger than zero in magnitude; and
  the bleeder current is equal to zero in magnitude; and
after the third time but before the fourth time,
  the light emitting diode current is equal to zero in magnitude; and
  the bleeder current is larger than zero in magnitude.

11. The controller system of claim 10 wherein:
from the first time to the second time, a rectifier current increases to a first magnitude;
from the second time to the third time, the rectifier current remains at a second magnitude; and
from the third time to the fourth time, the rectifier current decreases from a third magnitude.

12. The controller system of claim 11 wherein:
at the second time, the rectifier current rises from the first magnitude to the second magnitude; and
at the third time, the rectifier current drops from the second magnitude to the third magnitude;
wherein:
  the first magnitude is larger than zero;
  the second magnitude is larger than zero; and
  the third magnitude is larger than zero.

13. The controller system of claim 12 wherein the first magnitude and the third magnitude are equal.

14. The controller system of claim 7 wherein, after the first time but before the second time:
the rectified voltage remains larger than zero in magnitude;
a rectifier current remains larger than zero in magnitude; and
the rectified voltage and the rectifier current contribute to an active power to increase a power factor of the LED lighting system.

15. The controller system of claim 14 wherein, after the third time but before the fourth time:
the rectified voltage remains larger than zero in magnitude;
the rectifier current remains larger than zero in magnitude; and
the rectified voltage and the rectifier current contribute to the active power to increase the power factor of the LED lighting system.

16. A method for controlling a bleeder current of an LED lighting system, the method comprising:
receiving a rectified voltage generated by a rectifier that receives an AC input voltage;
receiving a sensing voltage representing a light emitting diode current flowing through one or more light emitting diodes; and
generating a bleeder current based at least in part on the rectified voltage and the sensing voltage;
wherein the generating a bleeder current based at least in part on the rectified voltage and the sensing voltage includes:

in response to the light emitting diode current being larger than zero in magnitude, generating the bleeder current equal to zero in magnitude; and in response to the light emitting diode current being equal to zero in magnitude, generating the bleeder current larger than zero in magnitude; and changing the bleeder current with the changing rectified voltage in magnitude;

wherein the generating a bleeder current based at least in part on the rectified voltage and the sensing voltage further includes, with the light emitting diode current being equal to zero in magnitude:

increasing the bleeder current with the increasing rectified voltage in magnitude; and decreasing the bleeder current with the decreasing rectified voltage in magnitude.

17. The method of claim 16 wherein a sum of the bleeder current and the light emitting diode current is equal to, in magnitude, a rectifier current generated by the rectifier.

18. The method of claim 17 wherein, with the light emitting diode current being equal to zero in magnitude, the rectified voltage and the rectifier current contribute to an active power to increase a power factor of the LED lighting system.

19. The method of claim 16 wherein the sensing voltage is directly proportional to the light emitting diode current in magnitude.

20. The method of claim 16, and further comprising:
in response to the light emitting diode current increasing from being equal to zero to being larger than zero, increasing a rectifier current from a first magnitude to a second magnitude; and
in response to the light emitting diode current decreasing from being larger than zero to being equal to zero, decreasing the rectifier current from the second magnitude to a third magnitude;
wherein:
the first magnitude is larger than zero;
the second magnitude is larger than zero; and
the third magnitude is larger than zero.

21. The method of claim 20 wherein the first magnitude and the third magnitude are equal.

22. The method of claim 16 wherein:
each cycle of the AC input voltage includes two half cycles of the AC input voltage; and
one half cycle of the AC input voltage starts at a first time, passes a second time and a third time, and ends at a fourth time;
wherein:
the first time precedes the second time;
the second time precedes the third time; and
the third time precedes the fourth time.

23. The method of claim 22 wherein:
the rectified voltage is equal to zero in magnitude at the first time and at the fourth time; and
after the first time but before the fourth time, the rectified voltage is larger than zero in magnitude during an entire duration from the first time to the fourth time.

24. The method of claim 23 wherein:
the rectified voltage becomes larger than a threshold voltage in magnitude at the second time; and
the rectified voltage becomes smaller than the threshold voltage in magnitude at the third time.

25. The method of claim 24, and further comprising:
after the first time but before the second time, with the light emitting diode current being equal to zero in magnitude, generating the bleeder current that is larger than zero in magnitude;
after the second time but before the third time, with the light emitting diode current being larger than zero in magnitude, generating the bleeder current that is equal to zero in magnitude; and
after the third time but before the fourth time, with the light emitting diode current being equal to zero in magnitude, generating the bleeder current that is larger than zero in magnitude.

26. The method of claim 25, and further comprising:
from the first time to the second time, increasing a rectifier current to a first magnitude;
from the second time to the third time, keeping the rectifier current at a second magnitude; and
from the third time to the fourth time, decreasing the rectifier current from a third magnitude.

27. The method of claim 26 wherein:
at the second time, increasing the rectifier current from the first magnitude to the second magnitude; and
at the third time, decreasing the rectifier current from the second magnitude to the third magnitude;
wherein:
the first magnitude is larger than zero;
the second magnitude is larger than zero; and
the third magnitude is larger than zero.

28. The method of claim 27 wherein the first magnitude and the third magnitude are equal.

29. The method of claim 22 wherein, after the first time but before the second time:
the rectified voltage remains larger than zero in magnitude;
a rectifier current remains larger than zero in magnitude; and
the rectified voltage and the rectifier current contribute to an active power to increase a power factor of the LED lighting system.

30. The method of claim 29 wherein, after the third time but before the fourth time:
the rectified voltage remains larger than zero in magnitude;
the rectifier current remains larger than zero in magnitude; and
the rectified voltage and the rectifier current contribute to the active power to increase the power factor of the LED lighting system.

* * * * *